US011558655B2

(12) United States Patent
Gupta et al.

(10) Patent No.: US 11,558,655 B2
(45) Date of Patent: Jan. 17, 2023

(54) SYSTEMS AND METHODS FOR SEAMLESSLY OUTPUTTING EMBEDDED MEDIA FROM A DIGITAL PAGE ON NEARBY DEVICES MOST SUITABLE FOR ACCESS

(71) Applicant: Rovi Guides, Inc., San Jose, CA (US)

(72) Inventors: Vikram Makam Gupta, Bangalore (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 212 days.

(21) Appl. No.: 17/251,624

(22) PCT Filed: Jun. 13, 2018

(86) PCT No.: PCT/US2018/037192
§ 371 (c)(1),
(2) Date: Dec. 11, 2020

(87) PCT Pub. No.: WO2019/240780
PCT Pub. Date: Dec. 19, 2019

(65) Prior Publication Data
US 2021/0250639 A1 Aug. 12, 2021

(51) Int. Cl.
*H04N 21/25* (2011.01)
*H04N 21/258* (2011.01)
(Continued)

(52) U.S. Cl.
CPC ... *H04N 21/43076* (2020.08); *H04N 21/4122* (2013.01); *H04N 21/43615* (2013.01); *H04N 21/4516* (2013.01); *G06F 2200/1637* (2013.01)

(58) Field of Classification Search
None
See application file for complete search history.

(56) References Cited

U.S. PATENT DOCUMENTS 10,412,434 B1 * 9/2019 Matthews .......... H04N 21/4394
2009/0138921 A1 5/2009 Miyata
(Continued)

FOREIGN PATENT DOCUMENTS

CN 105791947 7/2016

OTHER PUBLICATIONS

"ISR and Written Opinion", International Search Report and Written Opinion in PCT/US2018/037192 dated Aug. 21, 2018, dated Aug. 21, 2018.

(Continued)

*Primary Examiner* — Brian T Pendleton
*Assistant Examiner* — Jean D Saint Cyr
(74) *Attorney, Agent, or Firm* — Haley Guiliano LLP

(57) ABSTRACT

Systems and methods for enhancing user experience in accessing media of a certain content type by outputting the media on a nearby device that is better suited for access. For example, a media guidance application may determine that a user is accessing, on his/her smartphone, a digital page (e.g., a website, a newsfeed, etc.) that features embedded content (e.g., photos, movies, music, etc.). In response to determining that the user has navigated to an embedded content, such as a video clip, the media guidance application may determine a device in the vicinity of the user that is better suited than the user's smartphone for playback of the video clip. For example, a nearby smart television may have a larger screen, better sound output, and a better display resolution than the smartphone. As a result, the media guidance application may cause the smart television to output the video clip.

20 Claims, 16 Drawing Sheets

(51) Int. Cl.
*H04N 21/41* (2011.01)
*H04N 21/43* (2011.01)
*H04N 21/442* (2011.01)
*H04N 21/63* (2011.01)
*H04N 21/436* (2011.01)
*H04N 21/45* (2011.01)

(56) References Cited

U.S. PATENT DOCUMENTS

| | | |
|---|---|---|
| 2013/0173765 A1* | 7/2013 | Korbecki .......... H04N 21/42209 709/221 |
| 2015/0135238 A1* | 5/2015 | Wickenkamp ..... H04N 21/4122 725/80 |
| 2016/0323552 A1 | 11/2016 | Peterson |
| 2016/0345044 A1 | 11/2016 | Klappert et al. |
| 2018/0103079 A1 | 4/2018 | Lewis et al. |
| 2019/0208270 A1* | 7/2019 | Bates ............... H04N 21/43615 |

OTHER PUBLICATIONS

D. Volokh, Volokh, D., Implementing video playback in a scrolled list (ListView & RecyclerView), https://medium.com/@v.danylo/implementing-video-playback-in-a-scrolled-list-listview-recyclerview-d04bc2148429; Jan. 23, 2016, 16 pages., Jan. 23, 2016, 16.

* cited by examiner

SYSTEMS AND METHODS FOR SEAMLESSLY OUTPUTTING EMBEDDED MEDIA FROM A DIGITAL PAGE ON NEARBY DEVICES MOST SUITABLE FOR ACCESS

CROSS-REFERENCE TO RELATED APPLICATIONS

This application is a national stage application under 35 U.S.C. § 371 of International Application PCT/US2018/037192, filed Jun. 13, 2018, which is hereby incorporated by reference herein in its entirety.

BACKGROUND

In the related art, in response to receiving an instruction, a system may identify, from a group of devices in close proximity to the user, a device that is associated with the instruction. The system may then cause the identified device to execute the user's instruction. However, the related art relies on the user to provide an explicit instruction (e.g., record, fast-forward, etc.) and identifies the device based on its relevance to the instruction (e.g., a set-top box playing a movie may record the movie, given the instruction to record). The related art does not monitor for implicit triggers pertaining to accessing content and does not identify an optimized access device, in the vicinity of the user, that is technically capable for accessing the content and adequately oriented with respect to the user's perspective.

SUMMARY

Systems and methods are thus described that address the limitations of conventional media systems, specifically for enhancing user experience in accessing media of a certain content type, by outputting the media on a nearby device that is better suited for access. For example, the systems and methods may determine that a user is accessing, on his/her smartphone, a digital page (e.g., a website, a newsfeed, etc.) that features embedded content (e.g., photos, movies, music, etc.). Suppose that a user is scrolling through his/her social media newsfeed. In response to determining that the user has navigated to an embedded content, such as a video clip, the systems and methods may determine a device in the vicinity of the user that is better suited than the user's smartphone for playback of the video clip. For example, the smartphone may be unable to play high-definition video, may have a small display, and/or may have other connectivity issues that are not found in a smart television near the user. The smart television may have a larger screen, better sound output, and may have a better display resolution. As a result, the systems and methods described may generate, for display, the video clip on the smart television.

In some aspects, a media guidance application may determine that a user is accessing, on first user equipment, a digital page comprising a plurality of embedded media assets. Examples of the first user equipment include, but are not limited to, set-top boxes, smart displays, smartphones, laptops, and video game consoles. The digital page may be a user interface (UI) such as a website, a launcher (e.g., an Android interface with widgets), an application's UI, etc. The media assets of the digital page may include, but are not limited to, videos, photos, text, augmented reality simulators and video games. These media assets are embedded in the digital page. This indicates that the user may directly access the media asset on the digital page, without having to be redirected to a different digital page.

Suppose that the user is accessing a social media newsfeed (e.g., the Facebook newsfeed) on his/her smartphone. The media guidance application may determine, using an activity monitor or a memory allocation system, that the user is accessing the Facebook application on his/her smartphone. In some embodiments, the media guidance application may retrieve information from a pre-generated database that contains a list of applications that feature digital pages with pluralities of embedded media assets. For example, the database may include Facebook. Therefore, the media guidance application may determine that the user is accessing a digital page on the Facebook application. In some embodiments, the media guidance application may monitor the user's screen and perform image processing (e.g., edge detection, segmentation, etc.) to identify sections of the screen. Suppose that the sections of the newsfeed are classified, by the media guidance application, as "photo album" and "video." In response to identifying multiple sections, the media guidance application may determine that the user is accessing a digital page with a plurality of media assets.

The media guidance application may determine that the user has navigated, on the digital page, to a position of an embedded media asset of the plurality of embedded media assets. In an overarching example, consider that the Facebook application being accessed on the user's smartphone features a vertical newsfeed. Therefore, the user may only scroll up or down to access the content on the digital page. Furthermore, the newsfeed may be organized analogous to a list (e.g., one media asset after another). The order of the media assets may be: video, audio file, photo, and text.

In some embodiments, the media guidance application may determine that the user has navigated to the position of the embedded media asset by first identifying a display configuration of the first user equipment. For example, the display configuration may include the size of the display, the shape, the resolution, the number of displays, etc. The media guidance application may then determine focus regions of a display of the first user equipment, based on the display configuration. For example, suppose that the first user equipment has a camera input that can monitor the user's eye motion. The media guidance application may identify, by tracking the user's eye motion, a region of the display that the user is focusing on. In another example, the display configuration may be a data structure that indicates areas of the screen that users generally focus on (e.g., via collaborative filtering). A focus region may be defined by the media guidance application as a shape of a certain size that is located on the display (e.g., a circle with a 3-cm radius and an origin point at the center of the display).

The media guidance application may then determine a layout of the plurality of embedded media assets on the display. For example, the layout may represent the position of each embedded media asset of the plurality of embedded media assets on the digital page. Suppose that the digital page is 5000 pixels in length and 1080 pixels in width. The layout may be a data structure that indicates, for each embedded media asset, the length and width of the section of the digital page containing the embedded media asset and the center point of the section. For example, one of the embedded media assets may be a video titled "Avengers Infinity War Trailer." The video may be contained in a rectangular section of the digital page that is 640 pixels in length and 1080 pixels in width. The center of the rectangular section may be 500 pixels away from the top edge of the digital page and 540 pixels from the right edge of the digital page. Thus, the first entry of the layout's data structure may be the array {embedded media asset 1, 640p, 1080p, (500, 540)}. The media guidance application may retrieve metadata associated with the digital page to identify the positions of each embedded media asset and populate the layout's data structure. The media guidance application may also use image processing (e.g., edge detection, segmentation, etc.) to automatically approximate the positions of the embedded media assets.

The media guidance application may determine that the embedded media asset of the plurality of embedded media assets is in a first portion of the layout. For example, the media guidance application may identify the rectangular section highlighted above (i.e., length: 640p, width: 1080p, center: (500, 540)) as the first portion of the layout. The media guidance application may then determine that the first portion of the layout corresponds to a focus region of the first user equipment. Suppose that the focus region is in the center of the user's smartphone display. The user may scroll down the digital page such that the first portion containing the embedded media asset "Avengers Infinity War Trailer" falls in the center of the user's smartphone display. In another example, the media guidance application may monitor the user's eye motion and determine a focus region accordingly. In this case, the media guidance application may determine a first vector originating from the first eye of the user and a second vector originating from the second eye of the user. The respective vectors may represent a direction in which the eye is looking. The media guidance application may then determine an intersection of the vectors and determine whether the intersection occurs at the display of the first user equipment. In response to determining that the intersection occurs at the display, the media guidance application may determine the intersection point to be a focus region. In this example, if the first portion containing the embedded media asset exists at the focus region, the media guidance application may determine that the user is focused on embedded media asset. Thus, in response to determining that the first portion corresponds to the focus region, the media guidance application may determine that the user has navigated, on the digital page, to the position of the embedded media asset.

In some embodiments, the media guidance application may determine that the user has navigated to the position of the embedded media asset by first determining a layout of the plurality of embedded media assets with respect to the display. As previously discussed, the layout may be a data structure with information on the positions and display sizes of the embedded media assets of the plurality of media assets. The media guidance application may then determine whether the embedded media asset is obscured on the display, based on the layout. Suppose that the user's smartphone display can display 1080 pixels in width and 1920 pixels in length. As described previously, the digital page may be 5000 pixels in length. Thus, the display may not be able to display the entire digital page at once. The user therefore may be able to see only a limited number of embedded media assets at any given time and some embedded media assets may be only partially visible (e.g., the user may need to scroll up to view the entire portion containing the embedded media asset). The media guidance application may determine an embedded media asset to be obscured if the embedded media asset is only partially visible (e.g., cut off due to display size limitations), too small to adequately view (e.g., a small profile picture on a social feed post), blurred, etc.

In response to determining that the embedded media asset is not obscured, the media guidance application may determine a display size of the embedded media asset based on the layout. As previously mentioned, the media guidance application may retrieve information from the layout's data structure. For example, the media guidance application may access the first entry of the layout {embedded media asset 1, 640p, 1080p, (500, 540)}, in response to determining that embedded media asset 1 corresponds to "Avengers Infinity War Trailer." The display size of the video, based on the first entry, is 640×1080. The media guidance application may then determine whether the display size of the embedded media asset is greater than or equal to a threshold size. The threshold size may be predefined and retrievable from the memory of the first user equipment (e.g., the user's smartphone). In some embodiments, the media guidance application may set the threshold size to be the display size of the largest embedded media asset that is visible to the user on the digital page at a given time. Suppose that the threshold size is 500×500. In some embodiments, the media guidance application may convert the respective display sizes to respective areas. For example, the area of the embedded media asset may be 691,200 pixels squared, and the area of the threshold size may be 250,000 pixels squared. In response to determining that the display size is greater than the threshold size (e.g., based on the respective areas), the media guidance application may determine that the user has navigated, on the digital page, to the position of the embedded media asset. For example, the media guidance application may determine that the user intends to access "Avengers Infinity War Trailer" because the video is the largest unobscured embedded media asset visible to the user on the digital page at a given time.

In some embodiments, the media guidance application may determine that the user has navigated to the position of the embedded media asset by first determining that the user is scrolling through the plurality of embedded media assets on the digital page. For example, the media guidance application may detect an input (e.g., touch, verbal, biometric response, etc.) requesting to navigate to a different position of the digital page. For example, the media guidance application may detect that the user has made physical contact with the touchscreen display of the user's smartphone and has made a scrolling motion (e.g., pressed upwards along the screen or flicked). The media guidance application may then detect that the user has stopped scrolling at the position of the embedded media asset. For example, the user may stop scrolling (e.g., release the physical contact from the touchscreen display) at the portion that contains "Avengers Infinity War Trailer," as determined by the layout of the plurality of embedded media assets. The media guidance application may determine that the user has stopped scrolling for a threshold period of time. For example, the media guidance application may monitor, using a timer, whether the user has provided further input to navigate on the digital page. Suppose that the user remains on the portion containing "Avengers Infinity War Trailer" for 10 seconds. The media guidance application may continuously compare the amount of time the user remains on the portion with the threshold period of time (e.g., 10 seconds). In response to determining that the user has stopped scrolling for the threshold period of time (e.g., the amount of time the user remains idle on the portion exceeds or equals the threshold period of time), the media guidance application may determine that the user has navigated, on the digital page, to the position of the embedded media asset.

In some embodiments, the media guidance application may determine that the user has navigated to the position of the embedded media asset by first determining that the user is scrolling in a first direction through the plurality of embedded media assets on the digital page. Suppose that the user is providing navigation inputs on the digital page using physical contact on a touchscreen display. The user may push upwards along the display screen to scroll down the display page. The media guidance application may determine the direction in which the user is pushing and the direction in which the digital page is moving. This direction may be known as the first direction. The media guidance application may detect that the user scrolled past the embedded media asset. For example, the media guidance application may determine a focus region on the display of the first user equipment. Suppose that the focus area is represented by a circle at the center of the display with a radius of 3 centimeters. As the user scrolls along the display page, various embedded media assets may enter and exit the focus region. The media guidance application may determine that the user has scrolled past an embedded media asset if it enters and exits the focus region during one continuous input.

Subsequent to detecting that the user scrolled past the embedded media asset, the media guidance application may determine that the user is scrolling in a second direction, wherein the second direction is towards the embedded media asset. For example, the user may realize that he/she scrolled past content that he/she actually wants to access. The user may provide another input by pushing downwards along the display screen to return back to the content. The media guidance application may thus detect that the scrolling is happening in an opposite direction. The media guidance application may determine that the user has stopped scrolling at the position of the embedded media asset. For example, the embedded media asset may enter the focus region of the display, or may come into view without being obscured on the display. In response to determining that the user stopped scrolling at the position of the embedded media asset, the media guidance application may determine that the user has navigated, on the digital page, to the position of the embedded media asset.

In response to determining that the user has navigated, on the digital page, to the position of the embedded media asset, the media guidance application may identify a content type (e.g., video, audio, photo, etc.) of the embedded media asset. For example, the user may be accessing a video titled "Avengers Infinity War Trailer." The media guidance application may retrieve metadata associated with the embedded media asset and/or the digital page. The metadata associated with the digital page (e.g., the newsfeed) may indicate the plugins and processes required to generate, for display, an embedded media asset. For example, the "Avengers Infinity War Trailer" may be embedded in a built-in video player that features modules/plugins for video playback of the newsfeed. The metadata associated with "Avengers Infinity War Trailer" may indicate a video format (e.g., mp4, avi, etc.). Based on the metadata of the "Avengers Infinity War Trailer" and/or the newsfeed, the media guidance application may determine that the content type of the embedded media asset "Avengers Infinity War Trailer" is "video."

In some embodiments, the content type may be represented by a data structure (e.g., an array, a linked list, etc.) with additional details about the media content. For example, the metadata of "Avengers Infinity War Trailer" may contain details about how the video is encoded (e.g., H.264), the resolution range (e.g., from 480p to 1080p), the duration of the video, the frames per second, and the physical size of the video (e.g., 230 MB). The media guidance application may thus extract these details from the metadata and place them in the entries of the data structure.

The media guidance application may retrieve, from a data structure of access setting recommendations, a recommended device configuration for accessing the content type. The recommended device configuration may also be represented as a data structure that indicates recommended hardware components (e.g., display, audio output, virtual reality headset, etc.), processing recommendations (e.g., processor, memory, graphics, etc.), and software components (e.g., media player). Suppose that the content type is represented by an array {Video, H.264, 480p, 1080p, 30 fps, 64 s, 230 MB}. The recommended device configuration may consist of predetermined optimized device settings for accessing the content type. The media guidance application may, for example, determine the recommended device configuration to be {Hardware: [40-inch display, 1080p capability, audio output], Processing: [2.4 GHz Dual Core Processor, 256 MB VRAM, 600 Mhz Core Clock, 4 GB RAM], Software: [H.264 media player]}.

More specifically, the data structure of access setting recommendations may be divided as a binary decision tree. The top-most node may ask, "is the content a video?" and if the answer is "yes," the next node may ask "is the video encoded in H.264?". This binary approach may then ask, "is the minimum resolution 480p?", "is the maximum resolution 1080p?", "is the duration greater than 60 s?", "is the size greater than 200 MB?", etc. After traversing through the binary decision tree, the media guidance application may arrive at the recommended device configuration {Hardware: [40-inch display, 1080p capability, audio output], Processing: [2.4 GHz Dual Core Processor, 256 MB VRAM, 600 Mhz Core Clock, 4 GB RAM], Software: [H.264 media player]}, for accessing the content type represented as {Video, H.264, 480p, 1080p, 30 fps, 64 s, 230 MB}. It should be noted that the data structure of access setting recommendations is not limited to a binary decision tree. For example, the data structure may be a regular decision tree, a lookup table, a linked list, etc. In the case of a lookup table, for example, the media guidance application may search for recommended device configurations for "Video," recommended device configurations for "H.264," recommended device configurations for "480p minimum," etc. The media guidance application may then take all of the individual recommended device configurations and determine one recommended device configuration where each of the devices overlap. In this example, suppose that the recommended device configurations for "Video" are {Hardware: [11-inch display, 240p capability, audio output], Processing: [1.2 GHz Dual Core Processor, 128 MB VRAM, 200 Mhz Core Clock, 0.5 GB RAM], Software: [media player]} and the recommended device configurations for "H.264" are {Hardware: [11-inch display, 240p capability, audio output], Processing: [1.5 GHz Dual Core Processor, 128 MB VRAM, 200 Mhz Core Clock, 1 GB RAM], Software: [H.264 media player]}; the media guidance application may determine the overlap to be {Hardware: [11-inch display, 240p capability, audio output], Processing: [1.5 GHz Dual Core Processor, 128 MB VRAM, 200 Mhz Core Clock, 1 GB RAM], Software: [H.264 media player]}.

The media guidance application may then determine a first device configuration of the first user equipment. For example, the media guidance application may retrieve the device analytics of the user's smartphone from the memory of the smartphone or the Internet. Suppose that the first device configuration is {Hardware: [5-inch display, 720p capability, audio output], Processing: [1.9 GHz Dual Core Processor, 256 MB VRAM, 500 Mhz Core Clock, 3 GB RAM], Software: [H.264 media player]}.

The media guidance application may determine a first access score based on similarities between the recommended device configuration and the first device configuration. For example, the media guidance application may compare the data structure of the recommended device configuration and the data structure of the first device configuration. It should be noted that both data structures may be of the same type (e.g., arrays, linked lists, stacks, etc.). The media guidance application may take various approaches to determine the first access score. In some embodiments, the media guidance application may run a modified distance formula between the two data structures. For example, the media guidance application may determine that the difference array between the respective data structures is {Hardware: [−35-inch display, −360p capability, 0], Processing: [−0.5 GHz Dual Core Processor, 0, −100 Mhz Core Clock, −1 GB RAM], Software: [0]}. In this example, a "0" indicates that there is no difference, a negative number indicates that the actual device configuration entry is below the recommended device configuration entry, and a positive number indicates that the device configuration entry exceeds the recommended device configuration entry. The media guidance application may then normalize the difference array with respect to the recommended device configuration. For example, the value of −35-inch display may get divided by 40-inch display to yield −0.875. Applying this method to the other entries of the difference array, the media guidance application may determine that the normalized difference array is {Hardware: [−0.875, −0.33, 0], Processing: [−0.21, 0, −0.16, −0.25], Software: [0]}. The media guidance application may then sum the values of the normalized difference array to determine the first access score. For example, the first access score may be −1.825 based on the normalized difference array above. It should be noted that a first access score of "0" indicates that the first device configuration matches the recommended device configuration exactly. A negative access score represents that the first device configuration is inferior to the recommended device configuration and a positive access score represents that the first device configuration is superior to the recommended device configuration.

In some embodiments, the media guidance application may apply predetermined weights to each of the entries of the normalized difference array. The weights may represent an importance of the entry (e.g., from 0 to 1, with larger numbers representing a greater weight). For example, the weight of the RAM entry may be 0.5 and the weight of the processor entry may be 0.75. In some embodiments, the media guidance application may also do an initial scan through the normalized difference array for a value of "−1," which may indicate that the recommended component is missing entirely. For example, if the first user equipment has no audio output component, the first device configuration value for hardware audio may be "0," the difference array may thus indicate "-audio output," and the normalized difference array may be "−1." In response to detecting the absence of a component, the media guidance application may determine that the user equipment is not compatible with the content type and may automatically assign it with the lowest access score possible.

The media guidance application may then transmit a discovery message from the first user equipment. The payload of the discovery message may include information on the first user equipment and/or the embedded media asset. It should be noted that the discovery message may be sent by a third user equipment (e.g., a router) that serves as a bridge for the communication between the first user equipment (e.g., the user's smartphone) and second user equipment. In response to transmitting the discovery message, the media guidance application may identify the second user equipment. For example, the second user equipment (e.g., a smart TV) may receive the discovery message. In response, the second user equipment may send an acknowledgment message to the first user equipment. The acknowledgment message may include information about the second user equipment such as a device identifier (e.g., name), a device type (e.g., multimedia system, phone, display, etc.), authorized users, etc., and timestamps signifying when the discovery message was received and when the acknowledgment was transmitted.

In some embodiments, the media guidance application may identify the second user equipment by first receiving acknowledgment messages from a plurality of candidate devices, based on the discovery message. For example, the environment in which the user is located may have several user equipment devices in the user's vicinity. Accordingly, a plurality of candidate devices may respond to the discovery message. The acknowledgment messages may indicate the types of content each of the plurality of candidate devices is compatible with. Suppose that the plurality of candidate devices includes a Windows tablet, a MacBook, an Android TV, and an Amazon Echo. The media guidance application may determine, from each acknowledgment message, the type of device (e.g., a tablet, a laptop, a smart TV and a smart speaker, respectively) and the type of compatible content of the candidate device. In some embodiments, the media guidance application may determine, from the type of device, the type of compatible content associated with the candidate device. For example, a smart TV may be compatible with videos, visual games and audio, whereas a smart speaker may be only compatible with audio-based content. The media guidance application may thus identify, from the plurality of candidate devices, a subset of candidate devices that are compatible with the content type of the embedded media asset. As previously discussed, the user may be accessing the video "Avengers Infinity War Trailer." Because the smart speaker may be incompatible with this content type, the subset of candidate devices may therefore include the Windows tablet, the MacBook, and the Android TV.

The media guidance application may then, for each candidate device of the subset of candidate devices, determine a proximity to the user. The user's location may be determined by the media guidance application, based on the location of the first equipment device and the type of device. Based on the type of device (e.g., a laptop, a phone, a speaker, etc.) the media guidance application may be able to determine whether the device is mobile or stationary. For example, the media guidance application may determine that a mobile device such as a smartphone may be held by the user. Therefore, using GPS coordinates of the smartphone, the media guidance application may also be able to approximate the location of the user. If the first user equipment is a stationary device (e.g., a smart TV and/or set-top box), the media guidance application may use other techniques to approximate the user's location. For example, the media guidance application may monitor the user's position with respect to the set-top box using a camera, such as a security camera, a smartphone camera, a depth camera (e.g., a Microsoft Kinect), etc. The media guidance application may capture an image featuring the user and the first user equipment and utilize a pixel-to-distance conversion algorithm to determine the user's location with respect to the first user equipment. In response to determining the user's location, the media guidance application may determine the distance between the user and a candidate device. For example, the GPS coordinates of the user's smartphone and the Windows tablet may have a 1-meter difference. Therefore, if the user is holding the smartphone, the proximity to the user of the Windows tablet is also 1-meter. If the smartphone was 5-meters away from the user and a camera was able to detect this distance to the user, the media guidance application may determine that the proximity to the user of the Windows tablet is 6 meters. The media guidance application may repeat this process and determine the proximity to the user, for each candidate device in the subset. The media guidance application may also utilize NFC technology to determine the respective proximities.

Then, in response to determining that the proximity to the user of a respective candidate device is less than or equal to a threshold proximity, the media guidance application may identify the respective candidate device as the second user equipment. For example, the media guidance application may retrieve a threshold proximity from the memory of the first user equipment. Suppose that the threshold proximity is 6 meters. All devices in the subset of candidate devices may have a distance greater than 6 meters other than the Android TV (e.g., which is 5 meters away). Accordingly, in response to determining that the proximity of the user to the Android TV is less than the threshold proximity, the media guidance application may identify the Android TV as the second user equipment. In some embodiments, the media guidance application may identify as the second user equipment the candidate device with the shortest proximity to the user. In this case, the threshold proximity may be set as the shortest proximity to the user of the determined proximities of the subset of candidate devices.

In some embodiments, wherein the content type is associated with visuals (e.g., videos, photos, graphics, etc.), in response to identifying the subset of candidate devices that are compatible with the content type, the media guidance application may determine an orientation of a display of the respective candidate devices with respect to the user. For example, the media guidance application may determine the map of the environment in which the user is located. For example, the media guidance application may capture an image of a room that the user is located in (e.g., using the camera of the user's smartphone, a security camera, a thermal energy capture device, etc.), and apply image processing (e.g., edge detection, segmentation, etc.) and machine learning techniques (e.g., classification) to identify devices in the environment and their positions relative to each other. In addition to the devices, the media guidance application may identify the position of the user and the direction in which he/she is oriented. For embedded media assets associated with visuals (e.g., a photograph), the media guidance application may determine that the candidate device is required to have a display. Thus, the media guidance application may employ object recognition to identify the candidate devices and more specifically, the orientations of the respective displays. The media guidance application may generate a three-dimensional representation of the image and define the area between the user's eyes as the origin point (0, 0, 0). Furthermore, the orientations of the displays may be defined by mathematical planes with respect to the origin point (e.g., $A_1x+A_2y+A_3z+A_4=0$, where x, y, z are unit planes and $A_1$, $A_2$, $A_3$, and $A_4$ are constants).

The media guidance application may then determine whether the display of the respective candidate device is within a line of sight of the user, based on the orientation of the display. For example, in the three-dimensional representation, the media guidance application may generate a plane that intersects with the origin point (e.g., between the user's eyes) and is perpendicular to a face plane that contains or is parallel to the user's entire face (e.g., eyes, nose, mouth). As the user shifts his/her head, the generated plane may be recalculated in order to remain perpendicular to the user's face plane. This generated plane is the line of sight of the user, as it represents where the user can focus his/her eyesight. For each candidate device, the media guidance application may determine whether the orientation of the display is within the line of sight of the user by determining whether the plane representing the orientation is perpendicular to the plane representing the line of sight. As the angle between the planes deviates from 90 degrees (e.g., in any respect of the x-coordinate, y-coordinate, and z-coordinate scheme), the display becomes less ideal for viewing purposes. When the angle is 0 degrees in any direction, the orientation of the display is parallel to the user's line of sight. Thus, the user may not be able to view the screen at all, or the screen may appear obscured. If the display is facing away from the user, the media guidance application may not determine the plane of the orientation of the display for that particular device.

In some embodiments, the media guidance application may determine whether the display of the respective candidate device is within the line of sight of the user by determining, based on a position of the user, a field of view of the user. For example, rather than a plane that intersects with a point between the eyes and is perpendicular to the face plane, the media guidance application may determine the extent to which the user's eyes can observe the world in a given moment. Typically, the field of vision is represented by a cone (e.g., $x^2/A_1^2+y^2/A_2^2=z^2$, where x, y, z are unit planes and $A_1$ and $A_2$ are constants) or represented by an angle within which the user can see the world (e.g., 150 degrees horizontal range and 150 degrees vertical range). The media guidance application may determine a position of the respective candidate device with respect to the position of the user. As discussed in the example given previously, the Android TV may be 3 meters away from the user. The media guidance application may determine whether the display of the respective candidate device is within the field of view of the user, based on both the position of the respective candidate device and the orientation of the display of the respective candidate device. For example, the media guidance application may determine whether the plane representing the display is within the field of view (e.g., within the cone and/or angles) and/or is perpendicular to the line of sight.

In response to determining that the display of the respective candidate device is within the line of sight of the user, the media guidance application may determine a perceived display size of the respective candidate device, wherein the perceived display size is proportional to (1) a physical display size of the respective candidate device and (2) the distance between the user and the respective candidate device. For example, due to perception, a small display that is very close to the user's eyes may appear larger than a large display that is very far from the user's eyes. As discussed previously, the subset of candidate devices may include the Windows tablet, the MacBook, and the Android TV. For simplicity, suppose that the orientations of all displays are perpendicular to the line of sight of the user. The media guidance application may determine that the distance between each candidate device and the user's eyes is approximately, 1 meter, 2 meters, and 3 meters, respectively, and the physical display sizes, if described as the diagonal length of a display, are 0.2 meters, 0.33 meters, and 1 meter, respectively. Suppose that the physical display size represents a size of the display when the user is standing a threshold distance away from the display. As the user gets closer to the display, the display appears larger and likewise, as the user moves farther away, the display gets smaller. Suppose that the threshold distance is 1 meter. The perceived display size is proportional to the physical display size of the respective candidate device and the distance between the user and the respective candidate device (e.g., the Android TV's display appears at its physical display size 1-meter long diagonally, when placed 1 meter away from the user's eyes and appears one third of the physical display size—0.33 meters long diagonally, when placed 3 meters away). Accordingly, the perceived display size for the Windows tablet may be 0.2 meters, and the perceived display size of the MacBook may be 0.165 meters.

It should be noted that the media guidance application may use a different algorithm (e.g., non-linear) that is a function of physical display size, threshold distance, and the distance between the device and the user. The algorithm may also account for limitations in the user's vision. For example, the user may use glasses to see objects that are far away. The algorithm to calculate perceived display size may thus include the focal lengths of the lenses of the glasses as inputs. The media guidance application may determine whether the user uses vision correction tools (e.g., glasses, contact lenses, etc.) based on the user's profile. For example, the user may manually indicate his/her visual limitations.

The media guidance application may then identify the candidate device of the subset of candidate devices that has the largest perceived display size. As previously mentioned, the subset of candidate devices includes the Windows tablet with a perceived display size of 0.2 meters, the MacBook with a perceived display size of 0.165 meters, and the Android TV with a perceived display size of 0.33 meters. Thus, the candidate device with the largest perceived display size is the Android TV. In some embodiments, the media guidance application may also determine the physical display size of the first user equipment. For example, the physical display size of the user's smartphone display may be 0.13 meters long diagonally. Furthermore, the user may be holding the smartphone 0.3 meters away from his/her eyes. If the user does not intend to view the embedded in full-screen mode (e.g., the user has not selected full-screen mode or the full-screen mode option does not exist), the media guidance application may determine the display size of the embedded media asset. For example, the portion of the display containing the video "Avengers Infinity War Trailer" may only be 0.05 meters long diagonally. Accordingly, the perceived display size of the portion containing the embedded media asset may be 0.17 meters. If the perceived display size of the first user equipment is greater than the largest perceived display size of the subset of candidate devices, the media guidance application may output the embedded media asset on the display, rather than on a candidate device. Otherwise, in response to determining that the determined perceived display size of a candidate device of the subset of candidate devices is the largest of the perceived display sizes of the subset of candidate devices, the media guidance application may identify the candidate device as the second user equipment.

In some embodiments, wherein the content type is associated with audio (e.g., music, podcasts, radio, etc.), in response to identifying the subset of candidate devices that are compatible with the content type, the media guidance application may determine a maximum distance that sound outputted from the respective candidate device can travel. For example, the media guidance application may identify a smart speaker and a surround sound system as a subset of candidate devices that are compatible with audio output. The media guidance application may determine the maximum volume (e.g., in decibels) and implement a decibels-to-distance algorithm that may be a function of the volume, the size of the speaker associated with the candidate device, the type of environment in which the candidate device is located (e.g., retrieved acoustic information), and/or the size of environment, in order to determine the maximum distance. Alternatively, the media guidance application may use a sound damping calculation and that determines the decibel levels at a queried distance in proportion to the decibel level at a known distance. In response to determining that the distance between the user and the respective candidate device is less than the maximum distance, the media guidance application may determine a sound score of the respective candidate device, wherein the sound score represents a quality of sound at a threshold volume. Suppose that the media guidance application determines that the maximum distance that sound can travel, for all candidate devices, at a given volume is 5 meters. The media guidance application thus may identify only candidate devices in the subset of candidate devices that are 5 meters away from the user. For example, the media guidance application may determine that the surround sound system is 3 meters away from the user and the smart speaker, which also has a maximum distance for sound travel of 5 meters, is 10 meters away; the media guidance application may determine the sound score of the surround sound system only. The quality of sound at a threshold volume (e.g., the maximum volume) may be assessed based on the candidate device's ability to reproduce an input sound without audible issues. For example, the media guidance application may retrieve the quality of sound for a certain device from a sound database that lists the sound score of the device. The sound score may be a quantitative (e.g., 1 out of 10, 2 out of 10, etc.) or qualitative (e.g., "poor," "below average," "average," etc.) measure of sound. In response to determining that the sound score of the candidate device of the subset of candidate devices is the highest of the sound scores of the subset of candidate devices, the media guidance application may identify the candidate device as the second user equipment. Suppose that the maximum distance of sound travel is within the range of the user for both the smart speaker and the surround sound system. Based on the information received from the sound database, the media guidance application may determine that the sound score of the smart speaker is "average" and the sound score of the surround sound system is "excellent." Due to the higher score, the media guidance application may identify the surround sound system as the second user equipment.

In some embodiments, wherein the content type is associated with audio and visuals, and the media guidance application may identify the second user equipment by determining that a first candidate device of the subset of candidate devices has a perceived display size that is greater than a threshold size. For example, the threshold size may be the largest perceived display size of the determined perceived display sizes of the candidate devices. The media guidance application may then determine that a second candidate device, different from the first candidate device, of the subset of candidate devices has a sound score that is greater than a sound threshold. Suppose that the first candidate device is the Android TV. The media guidance application may determine that the first candidate device can also output sound. However, the media guidance application may identify a second candidate device (e.g., the surround sound system). The media guidance application may further determine that the sound score associated with the surround sound system is better than the sound score associated with the speakers of the Android TV. For example, the sound threshold may be the highest sound score of the determined sound scores of the candidate devices. Thus, the media guidance application may determine that the surround sound system is more appropriate for outputting sound. In response to determining that (1) the first candidate device has the perceived display size that is greater than the threshold size and (2) the second candidate device has the sound score that is greater than the sound threshold, the media guidance application may identify the second user equipment as a combination of the first candidate device for visuals and the second candidate device for audio. Thus, the sound associated with the embedded media asset may be outputted by the surround sound system and the visuals associated with the embedded media asset may be outputted by the Android TV.

The media guidance application may then determine a second device configuration of the second user equipment. The media guidance application may retrieve device details from the second user equipment (e.g., the Android TV). Suppose that the second device configuration is {Hardware: [32-inch display, 1080p capability, audio output], Processing: [2.7 GHz Dual Core Processor, 256 MB VRAM, 600 Mhz Core Clock, 4 GB RAM], Software: [H.264 media player]}.

The media guidance application may then determine a second access score based on similarities between the recommended device configuration and the second device configuration. As described previously, the media guidance application may determine a difference array between the recommended device configuration and the second device configuration. The difference array is determined by identifying similar entry fields (e.g., the RAM entry from the respective data structures) and determining the difference. In the overarching example, the recommended device configuration is {Hardware: [40-inch display, 1080p capability, audio output], Processing: [2.4 GHz Dual Core Processor, 256 MB VRAM, 600 Mhz Core Clock, 4 GB RAM], Software: [H.264 media player]}. Thus, the difference array is {Hardware: [−8-inch display, 0, 0], Processing: [+0.3 GHz Dual Core Processor, 0, 0, 0], Software: [0]}. The media guidance application may then determine the normalized difference array with respect to the recommended device configuration. The normalized difference array in this example may be {Hardware: [−0.2, 0, 0], Processing: [+0.125, 0, 0, 0], Software: [0]}. Suppose that the weight for all component entries is 1. The media guidance application may sum the values of each component entry in the normalized difference array to determine a second access score of −0.075.

The media guidance application may then determine whether the second access score is greater than the first access score. As calculated, by the media guidance application, the first access score is −1.825 and the second access score is −0.075. Therefore, the second access score is greater than the first access score.

In response to determining that the second access score is greater than the first access score, the media guidance application may cause the second user equipment to output a copy of the embedded media asset. The higher access score indicates that the second user equipment (e.g., the Android TV) is a better device for accessing the video "Avengers Infinity War Trailer" than the first user equipment (e.g., the user's smartphone). In some embodiments, the media guidance application may transmit the video "Avengers Infinity War Trailer" to the second user equipment. For example, the first user equipment may transmit a message to the second user equipment that includes the name of the embedded media asset, the recommended device configuration, the content type and the content source to retrieve the embedded media asset from. Suppose that the video on the newsfeed is from an external media source (e.g., YouTube). The media guidance application may thus transmit the YouTube link of the video to the second user equipment. In response to receiving and parsing the message, the second user equipment may retrieve the video from the content source. In some embodiments, the first user equipment may directly transmit the embedded media asset to the second user equipment. For example, the media guidance application may download the video and send the downloaded copy to the second user equipment. In some embodiments, the second user equipment may mirror the portion of the first user equipment that displays the embedded media asset. For example, the media guidance application may implement a segmentation algorithm to identify the portion of the newsfeed that displays "Avengers Infinity War Trailer" and transmit the portion to the second user equipment.

In response to receiving the embedded media asset and the recommended device configuration, the media guidance application may cause the second user equipment to output the copy of the embedded media asset. For example, the media guidance application may determine, based on the recommended device configuration and the content type, that the embedded media asset is a video that should play at high-definition (e.g., 1080p) at 30 fps. Thus, the media guidance application may generate, for display, the video accordingly. In the event that the embedded media asset is an audio file, the media guidance application may generate, for audio output, the audio file. In some embodiments, if the media guidance application determines that the embedded media asset is text, the media guidance application may utilize a natural language processing algorithm to convert the text to speech (e.g., a verbal clip) and generate, for audio output, the verbal clip.

In some embodiments, the media guidance application may determine that the first access score equals the second access score. In response, the media guidance application may generate, for display on the first user equipment, a user-selectable option to output the embedded media asset on the second user equipment. This allows the user to select whether he/she wishes to access the embedded media asset on the first user equipment or the second user equipment. In response to receiving the selection to output the embedded media asset on the second user equipment, the media guidance application may cause the output of a copy of the embedded media asset on the second user equipment.

In some embodiments, the media guidance application may cause the second user equipment to output the embedded media asset by first determining that the second user equipment is outputting a second media asset. For example, the Android TV may be generating, for display, a broadcast television show. In response to determining that the second user equipment is outputting the second media asset, the media guidance application may determine, based on a user profile of the user, an importance level of the embedded media asset and an importance level of the second media asset. Suppose that the second media asset is a commercial that starts and is not relevant to the user (e.g., the commercial is about a car). The media guidance application may determine, from the user profile, that the user is not interested in the car commercial and assign an importance level accordingly (e.g., a rating out of 10). For example, the importance level of the commercial may be 3 out of 10. Furthermore, the media guidance application may determine that the user has viewed several action movies, based on his/her viewing history. Thus, the media guidance application may determine the importance level of "Avengers Infinity War Trailer" to be 9 out of 10 (e.g., based on the length of time the user has spent watching similar content, the frequency at which the user watches similar content, the amount of similar content the user has viewed, etc.). In response to determining that the importance level of the first embedded media asset is greater than the importance level of the second media asset, the media guidance application may cause the second user equipment to output the first embedded media asset. For example, the media guidance application may completely replace, for display, the second media asset with the embedded media asset, and begin recording the second media asset. Alternatively, the media guidance application may place a PIP of the embedded media asset on top of the second media asset. In some embodiments, the media guidance application may generate a queue and generate, for display, the copy of the embedded media asset after the second media asset has finished playback.

In some embodiments, before causing the output of the embedded media asset on the second user equipment, the media guidance application may determine a parental control level for the embedded media asset (e.g., by accessing a parental controls database). For example, "Avengers Infinity War Trailer" may have a parental control level of PG-13. The media guidance application may then determine whether there are any parental locks associated with the second user equipment. For example, the Android TV may have a parental control that prevents content that is greater than PG from playback. In response to determining that the parental control level (e.g., PG-13) of the embedded media asset is greater than the parental lock level (e.g., PG), the media guidance application may prevent the output of the embedded media asset on the second user equipment.

In some embodiments, the media guidance application may determine that the user has navigated away from the embedded media asset. For example, the media guidance application may determine that the user has entered an input to scroll to a different portion of the digital page. Alternatively, the user may manually stop the embedded media asset from playback (e.g., press the pause button). In response, the media guidance application may cease output of the copy of the embedded media asset on the second user equipment.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are thus described for enhancing user experience in accessing media of a certain content type by outputting the media on a nearby device that is better suited for access. For example, the systems and methods may determine that a user is accessing, on his/her smartphone, a digital page (e.g., a website, a newsfeed, etc.) that features embedded content (e.g., photos, movies, music, etc.). Suppose that a user is scrolling through his/her social media newsfeed. In response to determining that the user has navigated to an embedded content, such as a video clip, the systems and methods may determine a device in the vicinity of the user that is better suited than the user's smartphone for playback of the video clip. For example, the smartphone may be unable to play high-definition video, may have a small display, and/or may have other connectivity issues that are not found in a smart television near the user. The smart television may have a larger screen, better sound output, and a better display resolution. As a result, the systems and methods described may generate, for display, the video clip on the smart television.

Figure 1:
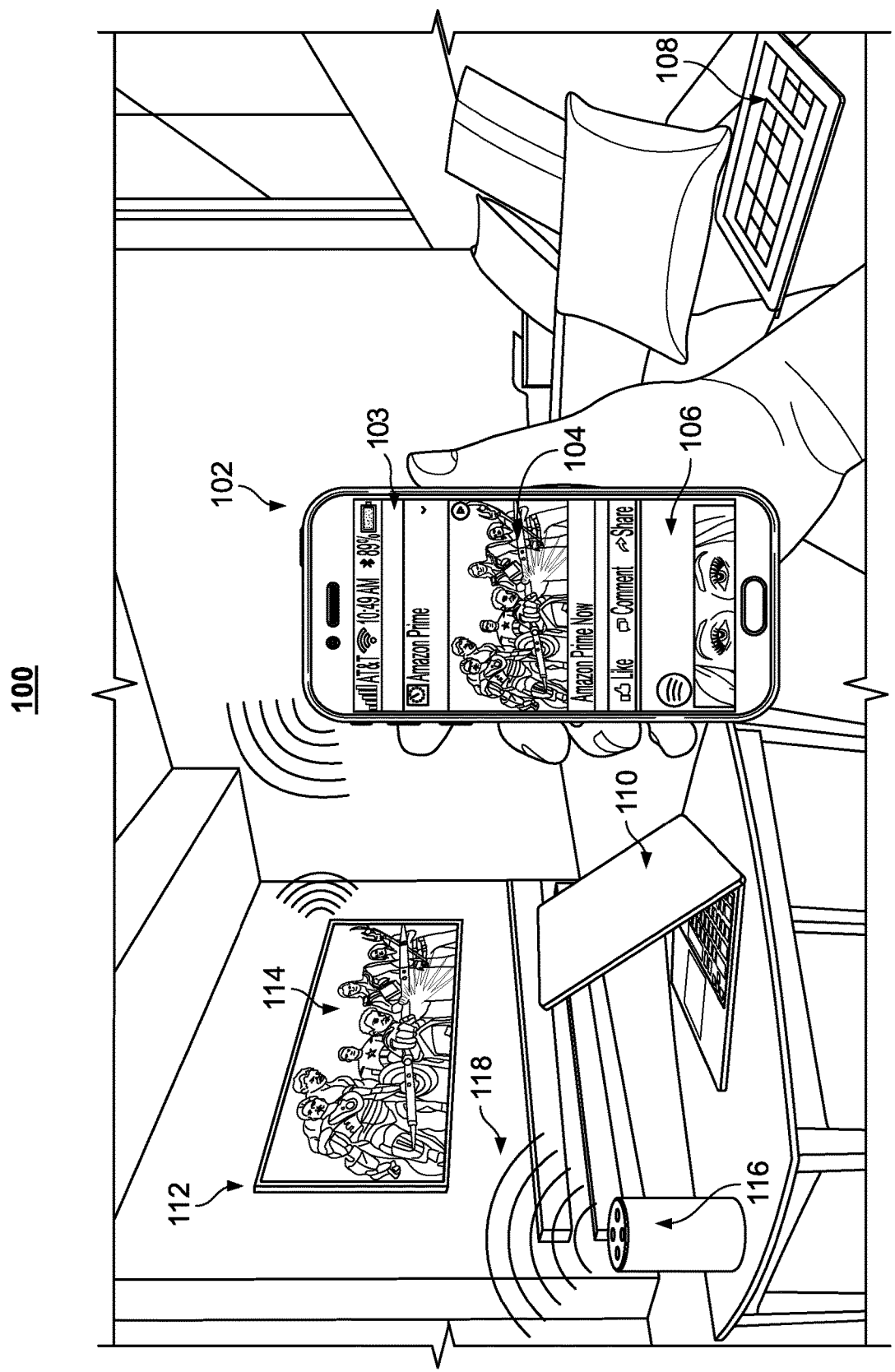
FIG. 1 shows an illustrative example of a scenario for accessing media of a visual content type by outputting the media on a nearby device that is better-suited for access, in accordance with some embodiments of the disclosure.

FIG. 1 shows an illustrative example of a scenario 100 for accessing media of a visual content type by outputting the media on a nearby device that is better suited for access, in accordance with some embodiments of the disclosure. In scenario 100, a media guidance application may determine that a user is accessing, on first user equipment 102, digital page 103 comprising a plurality of embedded media assets. Examples of first user equipment 102 include, but are not limited to, set-top boxes, smart displays, smartphones, laptops, and video game consoles. In this specific example, first user equipment 102 is a smartphone. Digital page 103 may be a user interface (UI) such as a website, a launcher (e.g., an Android interface with widgets), an application's UI, etc. The media assets of digital page 103 may include, but are not limited to, videos, photos, text, augmented reality simulators and video games. These media assets are embedded in digital page 103. This indicates that the user may directly access the media asset on digital page 103, without having to be redirected to a different digital page.

Suppose that the user is accessing a social media newsfeed (e.g., the Facebook newsfeed) on his/her smartphone. The media guidance application may determine, using an activity monitor or a memory allocation system, that the user is accessing the Facebook application on his/her smartphone. In some embodiments, the media guidance application may retrieve information from a pre-generated database that contains a list of applications that feature digital pages with pluralities of embedded media assets. For example, the database may include Facebook. Therefore, the media guidance application may determine that the user is accessing a digital page on the Facebook application. In some embodiments, the media guidance application may monitor the user's screen and perform image processing (e.g., edge detection, segmentation, etc.) to identify sections of the screen. Suppose that the sections of the newsfeed are classified, by the media guidance application, as "photo album" and "video." In response to identifying multiple sections, the media guidance application may determine that the user is accessing a digital page with a plurality of media assets.

The media guidance application may determine that the user has navigated, on digital page 103, to a position of embedded media asset 104 of the plurality of embedded media assets. In an overarching example, consider that the Facebook application being accessed on the user's smartphone features a vertical newsfeed. Therefore, the user may only scroll up or down to access the content on digital page 103. Furthermore, the newsfeed may be organized analogous to a list (e.g., one media asset after another). The order of the media assets may be: video, audio file, photo, and text.

In some embodiments, the media guidance application may determine that the user has navigated to the position of embedded media asset 104 by first identifying a display configuration of first user equipment 102. For example, the display configuration may include the size of the display, the shape, the resolution, the number of displays, etc. The media guidance application may then determine focus regions of a display of first user equipment 102, based on the display configuration. For example, suppose that first user equipment 102 has a camera input that can monitor the user's eye motion. The media guidance application may identify, by tracking the user's eye motion, a region of the display that the user is focusing on. In another example, the display configuration may be a data structure that indicates areas of the screen that users generally focus on (e.g., via collaborative filtering). A focus region may be defined by the media guidance application as a shape of a certain size that is located on the display (e.g., a circle with a 3-cm radius and an origin point at the center of the display).

The media guidance application may then determine a layout of the plurality of embedded media assets on the display. For example, the layout may represent the position of each embedded media asset of the plurality of embedded media assets on digital page 103. Suppose that digital page 103 is 5000 pixels in length and 1080 pixels in width. The layout may be a data structure that indicates, for each embedded media asset, the length and width of the section of digital page 103 containing embedded media asset 104 and the center point of the section. For example, one of the embedded media assets may be a video titled "Avengers Infinity War Trailer." The video may be contained in a rectangular section of digital page 103 that is 640 pixels in length and 1080 pixels in width. The center of the rectangular section may be 500 pixels away from the top edge of digital page 103 and 540 pixels from the right edge of digital page 103. Thus, the first entry of the layout's data structure may be the array {embedded media asset 1, 640p, 1080p, (500, 540)}. The media guidance application may retrieve metadata associated with digital page 103 to identify the positions of each embedded media asset and populate the layout's data structure. The media guidance application may also use image processing (e.g., edge detection, segmentation, etc.) to automatically approximate the positions of the embedded media assets.

The media guidance application may determine that embedded media asset 104 of the plurality of embedded media assets is in a first portion of the layout. For example, the media guidance application may identify the rectangular section highlighted above (i.e., length: 640p, width: 1080p, center: (500, 540)) as the first portion of the layout. The media guidance application may then determine that the first portion of the layout corresponds to a focus region of first user equipment 102. Suppose that the focus region is in the center of the user's smartphone display. The user may scroll down digital page 103 such that the first portion containing embedded media asset 104 "Avengers Infinity War Trailer" falls in the center of the user's smartphone display. In another example, the media guidance application may monitor the user's eye motion and determine a focus region accordingly. In this case, the media guidance application may determine a first vector originating from the first eye of the user and a second vector originating from the second eye of the user. The respective vectors may represent a direction in which the eye is looking. The media guidance application may then determine an intersection of the vectors and determine whether the intersection occurs at the display of first user equipment 102. In response to determining that the intersection occurs at the display, the media guidance application may determine the intersection point to be a focus region. In this example, if the first portion containing embedded media asset 104 exists at the focus region, the media guidance application may determine that the user is focused on the embedded media asset. Thus, in response to determining that the first portion corresponds to the focus region, the media guidance application may determine that the user has navigated, on digital page 103, to the position of embedded media asset 104.

In some embodiments, the media guidance application may determine that the user has navigated to the position of embedded media asset 104 by first determining that the user is scrolling in a first direction through the plurality of embedded media assets on digital page 103. Suppose that the user is providing navigation inputs on digital page 103 using physical contact on a touchscreen display. The user may push upwards along the display screen to scroll down the display page. The media guidance application may determine the direction in which the user is pushing and the direction in which digital page 103 is moving. This direction may be known as the first direction. The media guidance application may detect that the user scrolled past embedded media asset 104. For example, the media guidance application may determine a focus region on the display of first user equipment 102. Suppose that the focus area is represented by a circle at the center of the display with a radius of 3 centimeters. As the user scrolls along the display page, various embedded media assets may enter and exit the focus region. The media guidance application may determine that the user has scrolled past an embedded media asset if it enters and exits the focus region during one continuous input.

Subsequent to detecting that the user scrolled past embedded media asset 104, the media guidance application may determine that the user is scrolling in a second direction, wherein the second direction is towards embedded media asset 104. For example, the user may realize that he/she scrolled past content that he/she actually wants to access. The user may provide another input by pushing downwards along the display screen to return back to the content. The media guidance application may thus detect that the scrolling is happening in an opposite direction. The media guidance application may determine that the user has stopped scrolling at the position of embedded media asset 104. For example, embedded media asset 104 may enter the focus region of the display, or may come into view without being obscured on the display. In response to determining that the user stopped scrolling at the position of embedded media asset 104, the media guidance application may determine that the user has navigated, on digital page 103, to the position of embedded media asset 104.

In response to determining that the user has navigated, on digital page 103, to the position of embedded media asset 104, the media guidance application may identify a content type (e.g., video, audio, photo, etc.) of embedded media asset 104. For example, the user may be accessing a video titled "Avengers Infinity War Trailer." The media guidance application may retrieve metadata associated with embedded media asset 104 and/or digital page 103. The metadata associated with digital page 103 (e.g., the newsfeed) may indicate the plugins and processes required to generate, for display, an embedded media asset. For example, the "Avengers Infinity War Trailer" may be embedded in a built-in video player that features modules/plugins for video playback on the newsfeed. The metadata associated with "Avengers Infinity War Trailer" may indicate a video format (e.g., mp4, avi, etc.). Based on the metadata of the "Avengers Infinity War Trailer" and/or the newsfeed, the media guidance application may determine that the content type of embedded media asset 104 "Avengers Infinity War Trailer" is "video."

In some embodiments, the content type may be represented by a data structure (e.g., an array, a linked list, etc.) with additional details about the media content. For example, the metadata of "Avengers Infinity War Trailer" may contain details about how the video is encoded (e.g., H.264), the resolution range (e.g., from 480p to 1080p), the duration of the video, the frames per second, and the physical size of the video (e.g., 230 MB). The media guidance application may thus extract these details from the metadata and place them in the entries of the data structure.

The media guidance application may retrieve, from a data structure of access setting recommendations, a recommended device configuration for accessing the content type. The recommended device configuration may also be represented as a data structure that indicates recommended hardware components (e.g., display, audio output, virtual reality headset, etc.), processing recommendations (e.g., processor, memory, graphics, etc.), and software components (e.g., media player). Suppose that the content type is represented by an array {Video, H.264, 480p, 1080p, 30 fps, 64 s, 230 MB}. The recommended device configuration may consist of predetermined optimized device settings for accessing the content type. The media guidance application may, for example, determine the recommended device configuration to be {Hardware: [40-inch display, 1080p capability, audio output], Processing: [2.4 GHz Dual Core Processor, 256 MB VRAM, 600 Mhz Core Clock, 4 GB RAM], Software: [H.264 media player]}.

More specifically, the data structure of access setting recommendations may be divided as a binary decision tree. The topmost node may ask, "is the content a video?" and if the answer is "yes," the next node may ask "is the video encoded in H.264?". This binary approach may then ask, "is the minimum resolution 480p?", "is the maximum resolution 1080p?", "is the duration greater than 60 s?", "is the size greater than 200 MB?", etc. After traversing through the binary decision tree, the media guidance application may arrive at the recommended device configuration {Hardware: [40-inch display, 1080p capability, audio output], Processing: [2.4 GHz Dual Core Processor, 256 MB VRAM, 600 Mhz Core Clock, 4 GB RAM], Software: [H.264 media player]}, for accessing the content type represented as {Video, H.264, 480p, 1080p, 30 fps, 64 s, 230 MB}. It should be noted that the data structure of access setting recommendations is not limited to a binary decision tree. For example, the data structure may be a regular decision tree, a lookup table, a linked list, etc. In the case of a lookup table, for example, the media guidance application may search for recommended device configurations for "Video," recommended device configurations for "H.264," recommended device configurations for "480p minimum," etc. The media guidance application may then take all of the individual recommended device configurations and determine one recommended device configuration where each of the devices overlap. In this example, suppose that the recommended device configurations for "Video" are {Hardware: [11-inch display, 240p capability, audio output], Processing: [1.2 GHz Dual Core Processor, 128 MB VRAM, 200 Mhz Core Clock, 0.5 GB RAM], Software: [media player]} and the recommended device configurations for "H.264" are {Hardware: [11-inch display, 240p capability, audio output], Processing: [1.5 GHz Dual Core Processor, 128 MB VRAM, 200 Mhz Core Clock, 1 GB RAM], Software: [H.264 media player]}, the media guidance application may determine the overlap to be {Hardware: [11-inch display, 240p capability, audio output], Processing: [1.5 GHz Dual Core Processor, 128 MB VRAM, 200 Mhz Core Clock, 1 GB RAM], Software: [H.264 media player]}.

The media guidance application may then determine a first device configuration of first user equipment 102. For example, the media guidance application may retrieve the device analytics of the user's smartphone from the memory of the smartphone or the Internet. Suppose that the first device configuration is {Hardware: [5-inch display, 720p capability, audio output], Processing: [1.9 GHz Dual Core Processor, 256 MB VRAM, 500 Mhz Core Clock, 3 GB RAM], Software: [H.264 media player]}.

The media guidance application may determine a first access score based on similarities between the recommended device configuration and the first device configuration. For example, the media guidance application may compare the data structure of the recommended device configuration and the data structure of the first device configuration. It should be noted that both data structures may be of the same type (e.g., arrays, linked lists, stacks, etc.). The media guidance application may take various approaches to determine the first access score. In some embodiments, the media guidance application may run a modified distance formula between the two data structures. For example, the media guidance application may determine that the difference array between the respective data structures is {Hardware: [−35-inch display, −360p capability, 0], Processing: [−0.5 GHz Dual Core Processor, 0, −100 Mhz Core Clock, −1 GB RAM], Software: [0]}. In this example, a "0" indicates that there is no difference, a negative number indicates that the actual device configuration entry is below the recommended device configuration entry, and a positive number indicates that the device configuration entry exceeds the recommended device configuration entry. The media guidance application may then normalize the difference array with respect to the recommended device configuration. For example, the value of −35-inch display may get divided by 40-inch display to yield −0.875. Applying this method to the other entries of the difference array, the media guidance application may determine that the normalized difference array is {Hardware: [−0.875, −0.33, 0], Processing: [−0.21, 0, −0.16, −0.25], Software: [0]}. The media guidance application may then sum the values of the normalized difference array to determine the first access score. For example, the first access score may be −1.825 based on the normalized difference array above. It should be noted that a first access score of "0" indicates that the first device configuration matches the recommended device configuration exactly. A negative access score represents that the first device configuration is inferior to the recommended device configuration and a positive access score represents that the first device configuration is superior to the recommended device configuration.

In some embodiments, the media guidance application may apply predetermined weights to each of the entries of the normalized difference array. The weights may represent an importance of the entry (e.g., from 0 to 1, with larger numbers representing a greater weight). For example, the weight of the RAM entry may be 0.5 and the weight of the processor entry may be 0.75. In some embodiments, the media guidance application may also do an initial scan through the normalized difference array for a value of "−1," which may indicate that the recommended component is missing entirely. For example, if first user equipment 102 has no audio output component, the first device configuration value for hardware audio may be "0," the difference array may thus indicate "-audio output," and the normalized difference array may be "−1." In response to detecting the absence of a component, the media guidance application may determine that the user equipment is not compatible with the content type and may automatically assign it with the lowest access score possible.

The media guidance application may then transmit a discovery message from first user equipment 102. The payload of the discovery message may include information of first user equipment 102 and/or embedded media asset 104. It should be noted that the discovery message may be sent by a third user equipment (e.g., a router) that serves as a bridge for the communication between first user equipment 102 (e.g., the user's smartphone) and second user equipment. In response to transmitting the discovery message, the media guidance application may identify second user equipment 112. For example, second user equipment 112 (e.g., a smart TV) may receive the discovery message. In response, second user equipment 112 may send an acknowledgment message to first user equipment 102. The acknowledgment message may include information about second user equipment 112 such as a device identifier (e.g., name), a device type (e.g., multimedia system, phone, display, etc.), authorized users, etc., and timestamps signifying when the discovery message was received and when the acknowledgment was transmitted.

In some embodiments, the media guidance application may identify second user equipment 112 by first receiving acknowledgment messages from a plurality of candidate devices, based on the discovery message. For example, the environment in which the user is located may have several user equipment devices in the user's vicinity. Accordingly, a plurality of candidate devices may respond to the discovery message. The acknowledgment messages may indicate the types of content each of the plurality of candidate devices is compatible with. Suppose that the plurality of candidate devices includes portable tablet 108, laptop 110, television 112, and speaker 116. The media guidance application may determine, from each acknowledgment message, the type of device (e.g., a tablet, a laptop, a smart TV and a smart speaker, respectively) and the type of compatible content of the candidate device. In some embodiments, the media guidance application may determine, from the type of device, the type of compatible content associated with the candidate device. For example, a smart TV may be compatible with videos, visual games and audio, whereas a smart speaker may only be compatible with audio-based content. The media guidance application may thus identify, from the plurality of candidate devices, a subset of candidate devices that are compatible with the content type of embedded media asset 104. As previously discussed, the user may be accessing the video "Avengers Infinity War Trailer." Because the smart speaker may be incompatible with this content type, the subset of candidate devices may therefore include portable tablet 108, laptop 110, and television 112.

The media guidance application may then, for each candidate device of the subset of candidate devices, determine a proximity to the user. The user's location may be determined by the media guidance application, based on the location of the first equipment device and the type of device. Based on the type of device (e.g., a laptop, a phone, a speaker, etc.) the media guidance application may be able to determine whether the device is mobile or stationary. For example, the media guidance application may determine that a mobile device such as a smartphone may be held by the user. Therefore, using GPS coordinates of the smartphone, the media guidance application may also be able to approximate the location of the user. If first user equipment 102 is a stationary device (e.g., a smart TV and/or set-top box), the media guidance application may use other techniques to approximate the user's location. For example, the media guidance application may monitor the user's position with respect to the set-top box using a camera, such as a security camera, a smartphone camera, a depth camera (e.g., a Microsoft Kinect), etc. The media guidance application may capture an image featuring the user and first user equipment 102 and utilize a pixel-to-distance conversion algorithm to determine the user's location with respect to first user equipment 102. In response to determining the user's location, the media guidance application may determine the distance between the user and a candidate device. For example, the GPS coordinates of the user's smartphone and portable tablet 108 may have a 1-meter difference. Therefore, if the user is holding the smartphone, the proximity to the user of portable tablet 108 is also 1-meter. If the smartphone was 5-meters away from the user and a camera was able to detect this distance to the user, the media guidance application may determine that the proximity to the user of portable tablet 108 is 6 meters. The media guidance application may repeat this process and determine the proximity to the user, for each candidate device in the subset. The media guidance application may also utilize NFC technology to determine the respective proximities.

Then, in response to determining that the proximity to the user of a respective candidate device is less than or equal to a threshold proximity, the media guidance application may identify the respective candidate device as the second user equipment. For example, the media guidance application may retrieve a threshold proximity from the memory of first user equipment 102. Suppose that the threshold proximity is 6 meters. All devices in the subset of candidate devices may have a distance great than 6 meters other than television 112 (e.g., which is 5 meters away). Accordingly, in response to determining that the proximity of the user to television 112 is less than the threshold proximity, the media guidance application may identify television 112 as the second user equipment. In some embodiments, the media guidance application may identify, as the second user equipment, the candidate device with the shortest proximity to the user. In this case, the threshold proximity may be set as the shortest proximity to the user of the determined proximities of the subset of candidate devices.

In some embodiments, wherein the content type is associated with visuals (e.g., videos, photos, graphics, etc.), in response to identifying the subset of candidate devices that are compatible with the content type, the media guidance application may determine an orientation of a display of the respective candidate device with respect to the user. For example, the media guidance application may determine the map of the environment in which the user is located. For example, the media guidance application may capture an image of a room that the user is located in (e.g., using the camera of the user's smartphone, a security camera, a thermal energy capture device, etc.), and apply image processing (e.g., edge detection, segmentation, etc.) and machine learning techniques (e.g., classification) to identify devices in the environment and their positions relative to each other. In addition to the devices, the media guidance application may identify the position of the user and the direction in which he/she is oriented. For embedded media assets associated with visuals (e.g., a photograph), the media guidance application may determine that the candidate device is required to have a display. Thus, the media guidance application may employ object recognition to identify the candidate devices and more specifically, the orientations of the respective displays. The media guidance application may generate a three-dimensional representation of the image and define the area between the user's eyes as the origin point (0, 0, 0). Furthermore, the orientations of the displays may be defined by mathematical planes with respect to the origin point (e.g., $A_1 x + A_2 y + A_3 z + A_4 = 0$, where x, y, z are unit planes and $A_1, A_2, A_3$, and $A_4$ are constants).

The media guidance application may then determine whether the display of the respective candidate device is within a line of sight of the user, based on the orientation of the display. For example, in the three-dimensional representation, the media guidance application may generate a plane that intersects with the origin point (e.g., between the user's eyes) and is perpendicular to a face plane that contains or is parallel to the user's entire face (e.g., eyes, nose, mouth). As the user shifts his/her head, the generated plane may be recalculated in order to remain perpendicular to the user's face plane. This generated plane is the line of sight of the user, as it represents where the user can focus his/her eyesight. For each candidate device, the media guidance application may determine whether the orientation of the display is within the line of sight of the user by determining whether the plane representing the orientation is perpendicular to the plane representing the line of sight. As the angle between the planes deviates from 90 degrees (e.g., in any respect of the x-coordinate, y-coordinate, and z-coordinate scheme), the display becomes less ideal for viewing purposes. When the angle is 0 degrees in any direction, the orientation of the display is parallel to the user's line of sight. Thus, the user may not be able to view the screen at all, or the screen may appear obscured. If the display is facing away from the user, the media guidance application may not determine the plane of the orientation of the display for that particular device.

In some embodiments, the media guidance application may determine whether the display of the respective candidate device is within the line of sight of the user by determining, based on a position of the user, a field of view of the user. For example, rather than a plane that intersects with a point between the eyes and is perpendicular to the face plane, the media guidance application may determine the extent to which the user's eyes can observe the world in a given moment. Typically, the field of vision is represented by a cone (e.g., $x^2/A_1^2 + y^2/A_2^2 = z^2$, where x, y, z are unit planes and $A_1$ and $A_2$ are constants) or represented by an angle within which the user can see the world (e.g., 150 degrees horizontal range and 150 degrees vertical range). The media guidance application may determine a position of the respective candidate device with respect to the position of the user. As discussed in the example given previously, television 112 may be 3 meters away from the user. The media guidance application may determine whether the display of the respective candidate device is within the field of view of the user, based on both the position of the respective candidate device and the orientation of the display of the respective candidate device. For example, the media guidance application may determine whether the plane representing the display is within the field of view (e.g., within the cone and/or angles) and/or is perpendicular to the line of sight.

In response to determining that the display of the respective candidate device is within the line of sight of the user, the media guidance application may determine a perceived display size of the respective candidate device, wherein the perceived display size is proportional to (1) a physical display size of the respective candidate device and (2) the distance between the user and the respective candidate device. For example, due to perception, a small display that is very close to the user's eyes may appear larger than a large display that is very far from the user's eyes. As discussed previously, the subset of candidate devices may include portable tablet 108, laptop 110, and television 112. For simplicity, suppose that the orientations of all displays are perpendicular to the line of sight of the user. The media guidance application may determine that the distance between each candidate device and the user's eyes is approximately, 1-meter, 2 meters, and 3 meters, respectively, and the physical display sizes, if described as the diagonal length of a display, are 0.2 meters, 0.33 meters, and 1 meter, respectively. Suppose that the physical display size represents a size of the display when the user is standing a threshold distance away from the display. As the user gets closer to the display, the display appears larger and likewise, as the user moves further away, the display appears smaller. Suppose that the threshold distance is 1-meter. The perceived display size is proportional to the physical display size of the respective candidate device and the distance between the user and the respective candidate device (e.g., television 112's display appears at its physical display size—1-meter long diagonally, when placed 1-meter away from the user's eyes and appears one third of the physical display size—0.33 meters long diagonally, when placed 3 meters away). Accordingly, the perceived display size for portable tablet 108 may be 0.2 meters, and the perceived display size of laptop 110 may be 0.165 meters.

It should be noted that the media guidance application may use a different algorithm (e.g., non-linear) that is a function of physical display size, threshold distance, and the distance between the device and the user. The algorithm may also account for limitations in the user's vision. For example, the user may use glasses to see objects that are far away. The algorithm to calculate perceived display size may thus include the focal lengths of the lenses of the glasses as inputs. The media guidance application may determine whether the user uses vision correction tools (e.g., glasses, contact lenses, etc.) based on the user's profile. For example, the user may manually indicate his/her visual limitations.

The media guidance application may then identify the candidate device of the subset of candidate devices that has the largest perceived display size. As previously mentioned, the subset of candidate devices includes portable tablet 108 with a perceived display size of 0.2 meters, laptop 110 with a perceived display size of 0.165 meters, and television 112 with a perceived display size of 0.33 meters. Thus, the candidate device with the largest perceived display size is television 112. In some embodiments, the media guidance application may also determine the physical display size of first user equipment 102. For example, the physical display size of the user's smartphone display may be 0.13 meters long diagonally. Furthermore, the user may be holding the smartphone 0.3 meters away from his/her eyes. If the user does not intend to view the embedded in full-screen mode (e.g., the user has not selected full-screen mode or the full-screen mode option does not exist), the media guidance application may determine the display size of embedded media asset 104. For example, the portion of the display containing the video "Avengers Infinity War Trailer" may only be 0.05 meters long diagonally. Accordingly, the perceived display size of the portion containing embedded media asset 104 may be 0.17 meters. If the perceived display size of first user equipment 102 is greater than the largest perceived display size of the subset of candidate devices, the media guidance application may output embedded media asset 104 on the display, rather than on a candidate device. Otherwise, in response to determining that the determined perceived display size of a candidate device of the subset of candidate devices is the largest of perceived display sizes of the subset of candidate devices, the media guidance application may identify the candidate device as the second user equipment.

The media guidance application may then determine a second device configuration of second user equipment 112. The media guidance application may retrieve device details from second user equipment 112 (e.g., television 112). Suppose that the second device configuration is {Hardware: [32-inch display, 1080p capability, audio output], Processing: [2.7 GHz Dual Core Processor, 256 MB VRAM, 600 Mhz Core Clock, 4 GB RAM], Software: [H.264 media player]}.

The media guidance application may then determine a second access score based on similarities between the recommended device configuration and the second device configuration. As described previously, the media guidance application may determine a difference array between the recommended device configuration and the second device configuration. The difference array is determined by identifying similar entry fields (e.g., the RAM entry from the respective data structures) and determining the difference. In the overarching example, the recommended device configuration is {Hardware: [40-inch display, 1080p capability, audio output], Processing: [2.4 GHz Dual Core Processor, 256 MB VRAM, 600 Mhz Core Clock, 4 GB RAM], Software: [H.264 media player]}. Thus, the difference array is {Hardware: [−8-inch display, 0, 0], Processing: [+0.3 GHz Dual Core Processor, 0, 0, 0], Software: [0]}. The media guidance application may then determine the normalized difference array with respect to the recommended device configuration. The normalized difference array in this example may be {Hardware: [−0.2, 0, 0], Processing: [+0.125, 0, 0, 0], Software: [0]}. Suppose that the weights for all component entries is 1. The media guidance application may sum the values of each component entry in the normalized difference array to determine a second access score of −0.075.

The media guidance application may then determine whether the second access score is greater than the first access score. As calculated, by the media guidance application, the first access score is −1.825 and the second access score is −0.075. Therefore, the second access score is greater than the first access score.

In response to determining that the second access score is greater than the first access score, the media guidance application may cause second user equipment 112 to output a copy of embedded media asset 104 (e.g., media asset 114). The higher access score indicates that second user equipment 112 (e.g., television 112) is a better device for accessing the video "Avengers Infinity War Trailer" than first user equipment 102 (e.g., the user's smartphone). In some embodiments, the media guidance application may transmit the video "Avengers Infinity War Trailer" to second user equipment 112. For example, first user equipment 102 may transmit a message to second user equipment 112 that includes the name of embedded media asset 104, the recommended device configuration, the content type and the content source to retrieve embedded media asset 104 from. Suppose that the video on the newsfeed is from an external media source (e.g., YouTube). The media guidance application may thus transmit the YouTube link of the video to second user equipment 112. In response to receiving and parsing the message, second user equipment 112 may retrieve the video from the content source. In some embodiments, first user equipment 102 may directly transmit embedded media asset 104 to second user equipment 112. For example, the media guidance application may download the video and send the downloaded copy (e.g., media asset 114) to second user equipment 112. In some embodiments, second user equipment 112 may mirror the portion of first user equipment 102 that displays embedded media asset 104. For example, the media guidance application may implement a segmentation algorithm to identify the portion of the newsfeed that displays "Avengers Infinity War Trailer" and transmit the portion to second user equipment 112.

In response to receiving embedded media asset 104 and the recommended device configuration, the media guidance application may cause second user equipment 112 to output the copy of embedded media asset 104 (e.g., media asset 114). For example, the media guidance application may determine, based on the recommended device configuration and the content type, that embedded media asset 104 is a video that should play at high-definition (e.g., 1080p) at 30 fps. Thus, the media guidance application may generate, for display, the video accordingly. In the event that embedded media asset 104 is an audio file, the media guidance application may generate, for audio output, the audio file. In some embodiments, if the media guidance application determines that embedded media asset 104 is text, the media guidance application may utilize a natural language processing algorithm to convert the text to speech (e.g., a verbal clip) and generate, for audio output, the verbal clip.

In some embodiments, wherein the content type is associated with audio and visuals, and the media guidance application may identify the second user equipment by determining that a first candidate device of the subset of candidate devices has a perceived display size that is greater than a threshold size. For example, the threshold size may be the largest perceived display size of the determined perceived display sizes of the candidate devices. The media guidance application may then determine that a second candidate device, different from the first candidate device, of the subset of candidate devices has a sound score that is greater than a sound threshold. Suppose that the first candidate device is television 112. The media guidance application may determine that the first candidate device can also output sound. However, the media guidance application may identify a second candidate device (e.g., speaker 116). The media guidance application may further determine that the sound score associated with speaker 116 is better than the sound score associated with the speakers of television 112. For example, the sound threshold may be the highest sound score of the determined sound scores of the candidate devices. Thus, the media guidance application may determine that speaker 116 is more appropriate for outputting sound. In response to determining that (1) the first candidate device has the perceived display size that is greater than the threshold size and (2) the second candidate device has the sound score that is greater than the sound threshold, the media guidance application may identify the second user equipment as a combination of the first candidate device for visuals and the second candidate device for audio. Thus, the sound associated with embedded media asset 104 may be outputted by speaker 116 and the visuals associated with embedded media asset 104 may be outputted by television 112.

In some embodiments, the media guidance application may determine that the first access score equals the second access score. In response, the media guidance application may generate, for display on first user equipment 102, a user-selectable option to output embedded media asset 104 on second user equipment 112. This allows the user to select whether he/she wishes to access embedded media asset 104 on first user equipment 102 or second user equipment 112. In response to receiving the selection to output embedded media asset 104 on second user equipment 112, the media guidance application may cause the output of a copy of embedded media asset on second user equipment 112 (e.g., media asset 114).

In some embodiments, the media guidance application may cause second user equipment 112 to output embedded media asset 104 by first determining that second user equipment 112 is outputting a second media asset. For example, television 112 may be generating, for display, a broadcast television show. In response to determining that second user equipment 112 is outputting the second media asset, the media guidance application may determine, based on a user profile of the user, an importance level of embedded media asset 104 and an importance level of the second media asset. Suppose that the second media asset is a commercial that starts and is not relevant to the user (e.g., the commercial is about a car). The media guidance application may determine, from the user profile, that the user is not interested in the car commercial and assign an importance level accordingly (e.g., a rating out of 10). For example, the importance level of the commercial may be 3 out of 10. Furthermore, the media guidance application may determine that the user has viewed several action movies, based on his/her viewing history. Thus, the media guidance application may determine the importance level of "Avengers Infinity War Trailer" to be 9 out of 10 (e.g., based on the length of time the user has spent watching similar content, the frequency at which the user watches similar content, the amount of similar content the user has viewed, etc.). In response to determining that the importance level of the first embedded media asset is greater than the importance level of the second media asset, the media guidance application may cause second user equipment 112 to output the first embedded media asset. For example, the media guidance application may completely replace, for display, the second media asset with embedded media asset 104, and begin recording the second media asset. Alternatively, the media guidance application may place a PIP of embedded media asset 104 on top of the second media asset. In some embodiments, the media guidance application may generate a queue and generate, for display, the copy of embedded media asset 104 (e.g., media asset 114) after the second media asset has finished playback.

In some embodiments, before causing the output of embedded media asset 104 on second user equipment 112, the media guidance application may determine a parental control level for embedded media asset 104 (e.g., by accessing a parental controls database). For example, "Avengers Infinity War Trailer" may have a parental control level of PG-13. The media guidance application may then determine whether there are any parental locks associated with second user equipment 112. For example, television 112 may have a parental control that prevents content that is greater than PG from playback. In response to determining that the parental control level (e.g., PG-13) of embedded media asset 104 is greater than the parental lock level (e.g., PG), the media guidance application may prevent the output of embedded media asset 104 on second user equipment 112.

In some embodiments, the media guidance application may determine that the user has navigated away from embedded media asset 104. For example, the media guidance application may determine that the user has entered an input to scroll to a different portion of digital page 103. Alternatively, the user may manually stop embedded media asset 104 from playback (e.g., press the pause button). In response, the media guidance application may cease output of the copy of embedded media asset 104 on second user equipment 112 (e.g., media asset 114).

Adding onto the details described in scenario 100, the media guidance application may determine that the user has navigated to the position of embedded media asset 106 by first determining a layout of the plurality of embedded media assets with respect to the display. As previously discussed, the layout may be a data structure with information of the positions and display sizes of the embedded media assets of the plurality of media assets. The media guidance application may then determine whether embedded media asset 106 is obscured on the display, based on the layout. Suppose that the user's smartphone display can display 1080 pixels in width and 1920 pixels in length. As described previously, digital page 103 may be 5000 pixels in length. Thus, the display may not be able to display the entire digital page at once. The user therefore may only be able to see a limited number of embedded media assets at any given time and some embedded media assets may only be partially visible (e.g., the user may need to scroll up to view the entire portion containing embedded media asset 104). The media guidance application may determine an embedded media asset to be obscured if embedded media asset 106 is only partially visible (e.g., cut off due to display size limitations), too small to adequately view (e.g., a small profile picture on a social feed post), blurred, etc.

In response to determining that embedded media asset 106 is obscured, the media guidance application may determine that embedded media asset 104 is not obscured, and may determine a display size of embedded media asset 104 based on the layout. As previously mentioned, the media guidance application may retrieve information from the layout's data structure. For example, the media guidance application may access the first entry of the layout {embedded media asset 1, 640p, 1080p, (500, 540)}, in response to determining that embedded media asset 104 corresponds to "Avengers Infinity War Trailer." The display size of the video, based on the first entry, is 640×1080. The media guidance application may then determine whether the display size of embedded media asset 104 is greater than or equal to a threshold size. The threshold size may be predefined and retrievable from the memory of first user equipment 102 (e.g., the user's smartphone). In some embodiments, the media guidance application may set the threshold size to be the display size of the largest embedded media asset that is visible to the user on digital page 103 at a given time. Suppose that the threshold size is 500×500. In some embodiments, the media guidance application may convert the respective display sizes to respective areas. For example, the area of embedded media asset 104 may be 691,200 pixels squared and the area of the threshold size may be 250,000 pixels squared. In response to determining that the display size is greater than the threshold size (e.g., based on the respective areas), the media guidance application may determine that the user has navigated, on digital page 103, to the position of embedded media asset 104. For example, the media guidance application may determine that the user intends to access "Avengers Infinity War Trailer" because the video is the largest unobscured embedded media asset visible to the user on digital page 103 at a given time.

Figure 2:
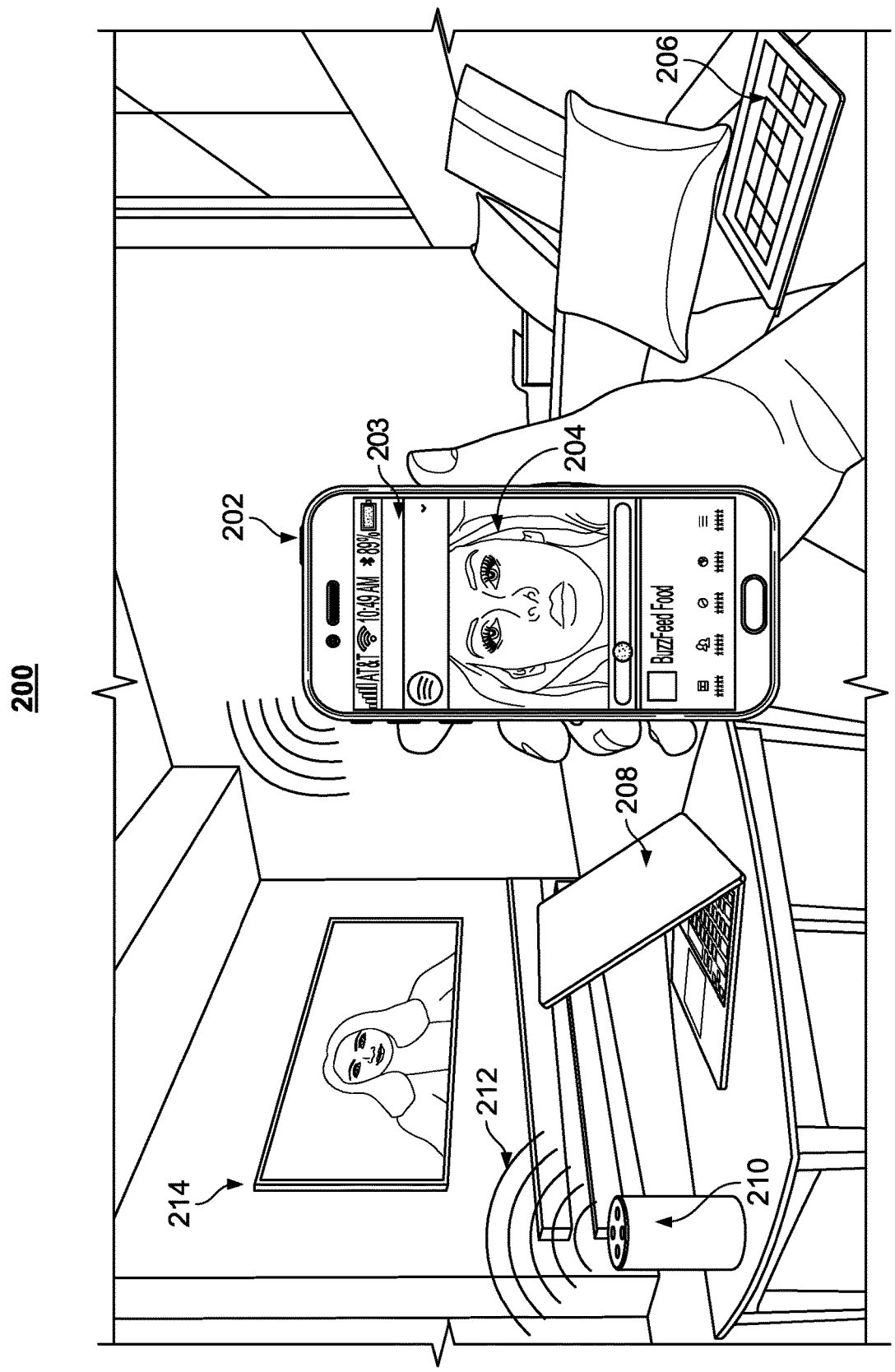
FIG. 2 shows an illustrative example of a scenario for accessing media of an audio-based content type by outputting the media on a nearby device that is better suited for access, in accordance with some embodiments of the disclosure.

FIG. 2 shows an illustrative example of a scenario 200 for accessing media of an audio-based content type by outputting the media on a nearby device that is better suited for access, in accordance with some embodiments of the disclosure. In scenario 200, the media guidance application may determine that the user has navigated to the position of embedded media asset 204 (e.g., previously embedded media asset 106 of FIG. 1) by first determining that the user is scrolling through the plurality of embedded media assets on digital page 203 (e.g., previously digital page 103 of FIG. 1). For example, the user may detect an input (e.g., touch, verbal, biometric response, etc.) requesting to navigate to a different position of digital page 203. For example, the media guidance application may detect that the user has made physical contact with the touchscreen display of the user's smartphone and has made a scrolling motion (e.g., pressed upwards along the screen or flicked). The media guidance application may then detect that the user has stopped scrolling at the position of embedded media asset 204. For example, the user may stop scrolling (e.g., release the physical contact from the touchscreen display) at the portion that contains the song "'Hello' by Adele," as determined by the layout of the plurality of embedded media assets. The media guidance application may determine that the user has stopped scrolling for a threshold period of time. For example, the media guidance application may monitor, using a timer, whether the user has provided further input to navigate on digital page 203. Suppose that the user remains on the portion containing "'Hello' by Adele" for 10 seconds. The media guidance application may continuously compare the amount of time the user remains on the portion with the threshold period of time (e.g., 10 seconds). In response to determining that the user has stopped scrolling for the threshold period of time (e.g., the amount of time the user remains idle on the portion exceeds or equals the threshold period of time), the media guidance application may determine that the user has navigated, on digital page 203, to the position of embedded media asset 204.

In some embodiments, wherein the content type is associated with audio (e.g., music, podcasts, radio, etc.), in response to identifying the subset of candidate devices that are compatible with the content type, the media guidance application may determine a maximum distance that sound outputted from the respective candidate device can travel. For example, the media guidance application may identify the speakers of smartphone 202, portable tablet 206, laptop 208, television 214 and speaker 210 as a subset of candidate devices that are compatible with audio output. The media guidance application may determine, for each candidate device of the subset, the maximum volume (e.g., in decibels) and implement a decibels-to-distance algorithm that may be a function of the volume, the size of the speaker associated with the candidate device, the type of environment in which the candidate device is located (e.g., retrieved acoustic information), and/or the size of environment, in order to determine the maximum distance. Alternatively, the media guidance application may use a sound damping calculation that determines the decibel levels at a queried distance in proportion to the decibel level at a known distance. In response to determining that the distance between the user and the respective candidate device is less than the maximum distance, the media guidance application may determine a sound score of the respective candidate device, wherein the sound score represents a quality of sound at a threshold volume. Suppose that the media guidance application determines that the maximum distance that sound can travel for each of the candidate devices at a given volume is 5 meters. The media guidance application may only identify candidate devices in the subset of candidate devices that are 5 meters away from the user. For example, the media guidance application may determine that speaker 210 is 3 meters away from the user, smartphone 202 is 0.2 meters away, and all other candidate devices are 10 meters away. In response, the media guidance application may only determine the sound score of speaker 210 and smartphone 202. The quality of sound at a threshold volume (e.g., the maximum volume) may be assessed based on the candidate device's ability to reproduce an input sound without audible issues. For example, the media guidance application may retrieve the quality of sound for a certain device from a sound database that lists the sound score the device. The sound score may be a quantitative (e.g., 1 out of 10, 2 out of 10, etc.) or qualitative (e.g., "poor," "below average," "average," etc.) measure of sound. In response to determining that the sound score of the candidate device of the subset of candidate devices is the highest of sound scores of the subset of candidate devices, the media guidance application may identify the candidate device as the second user equipment. For example, based on the information received from the sound database, the media guidance application may determine that the sound score of speaker 210 is "excellent" and the sound score of smartphone 202 is "average." Due to the higher score, the media guidance application may identify speaker 210 as the second user equipment.

Figure 3:
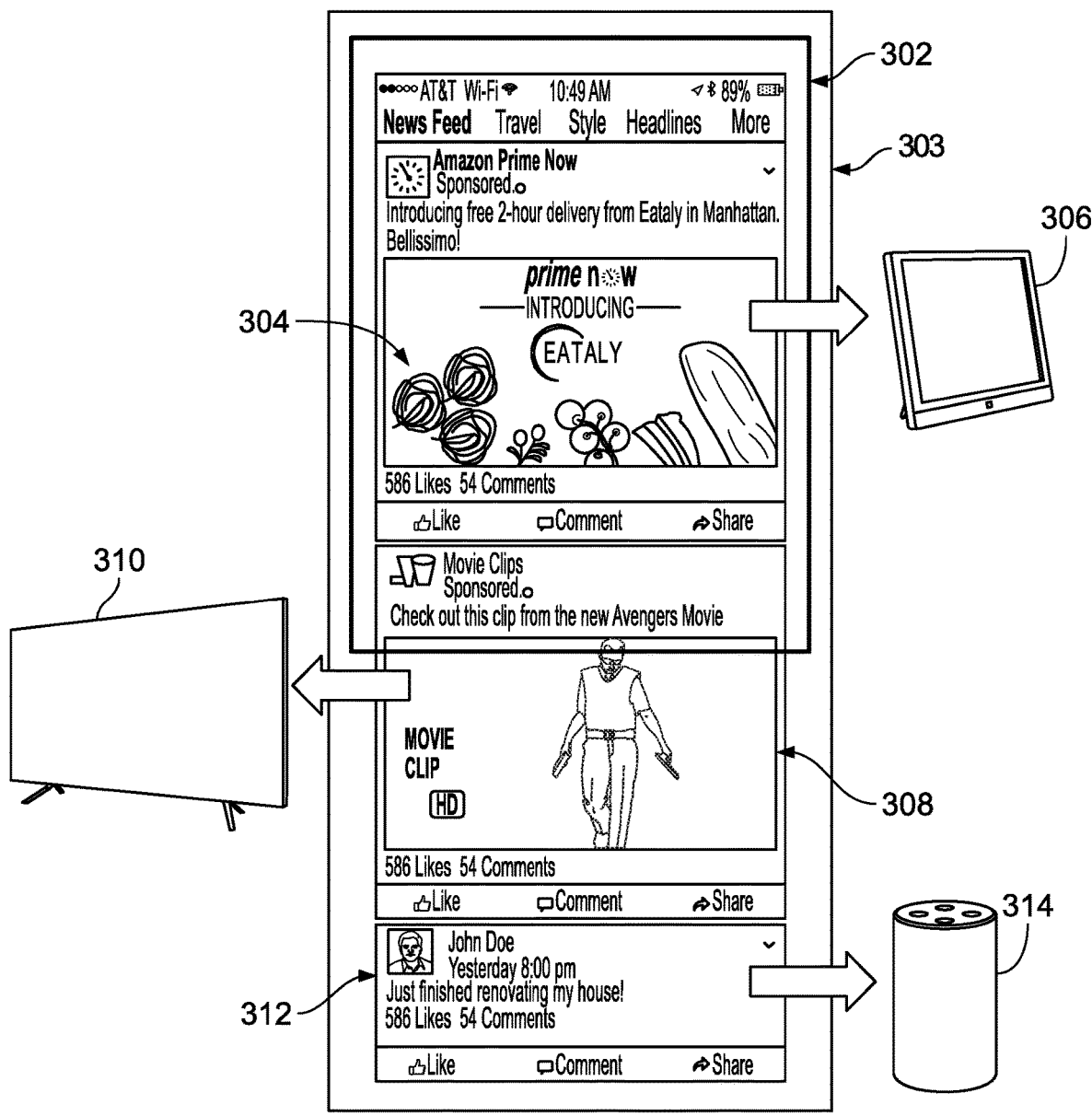
FIG. 3 shows an illustrative example of a digital page and the layout of a plurality of embedded media assets, in accordance with some embodiments of the disclosure.

FIG. 3 shows an illustrative example 300 of a digital page and the layout of a plurality of embedded media assets, in accordance with some embodiments of the disclosure. Suppose that the user is accessing digital page 303 on his/her smartphone. Display 302 represents the display area on which the user can view a section of digital page 303. For example, at any given time, display 302 may only be able to show a display area that is 1080 pixels wide and 1920 pixels long. On the other hand, digital page 303 may be 1080 pixels wide and 3200 pixels long. As a large portion of digital page 303 cannot be seen, the user will need to scroll down display 302 to access the non-visible portion of digital page 303. Suppose that the respective content types of embedded media assets, 304 (e.g., a photo of an advertisement), 308 (e.g., a trailer of a movie) and 312 (e.g., a status update post) are associated with image, video, and text, respectively. The media guidance application, using the methods described previously, may determine that the best devices near the user to output the embedded media assets are frame 306, television 310, and speaker 314, respectively.

Suppose that the user is accessing embedded media asset 304 on frame 306. As can be seen in FIG. 3, embedded media asset 308 may only be partially visible (e.g., obscured) in display 302. Thus, in some embodiments, the media guidance application may determine a layout of the plurality of embedded media assets, using the methods previously discussed. Based on the layout, the media guidance application may identify embedded media asset 308. The media guidance application may then determine whether the user will navigate to embedded media asset 308 after accessing embedded media asset 304 by first determining, based on the layout, that embedded media asset 308 is embedded on digital page 303 near embedded media asset 304. In response to determining that embedded media asset 308 is embedded near embedded media asset 304, the media guidance application may determine whether an attribute of embedded media asset 308 corresponds to an attribute in a user profile of the user. For example, the media guidance application may determine that embedded media asset 308 is a trailer for the movie "Avengers Infinity War." The media guidance application may determine an attribute such as the type of media, the genre, the actors, the theme, the characters, the locations, etc., associated with embedded media asset 308, and then determine whether the user's user profile includes the attribute. For example, the user profile may contain a viewing history that includes several entries of media asset viewings associated with the characters in embedded media asset 308. In response to determining that the attribute of embedded media asset 308 (e.g., the character "Captain America" in the trailer) corresponds to an attribute of the user profile (e.g., the viewing history includes movies featuring the character), the media guidance application may determine that the user will navigate to embedded media asset 308 after embedded media asset 304. In response to determining that the user will navigate to embedded media asset 308 after embedded media asset 304, the media guidance application may identify a third user equipment that can output embedded media asset 308. The third user equipment may be identified using the methods described previously. Suppose that the media guidance application identifies television 310. Accordingly, the media guidance application may preload embedded media asset 308 at television 310, to automatically output embedded media asset 308 when the user navigates to embedded media asset 308. The preloading (e.g., pre-caching) process may allow the user to access an embedded media asset immediately after navigating to the embedded media asset. This same process can also be applied to preload a text-to-speech conversion of embedded media asset 312 on speaker 314, while the user is accessing either embedded media asset 304 or 308. The determination of whether to preload an embedded media asset on a third user equipment may also be based on the user's history of accessing digital pages on the first user equipment. For example, if the user tends to access digital pages for 30 minutes on average, the media guidance application may use the average time of access and determine whether the user is about to exceed the average time during a session of access. If the user has exceeded the average time of access, the media guidance application may determine not to preload the respective embedded media assets on the third user equipment.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
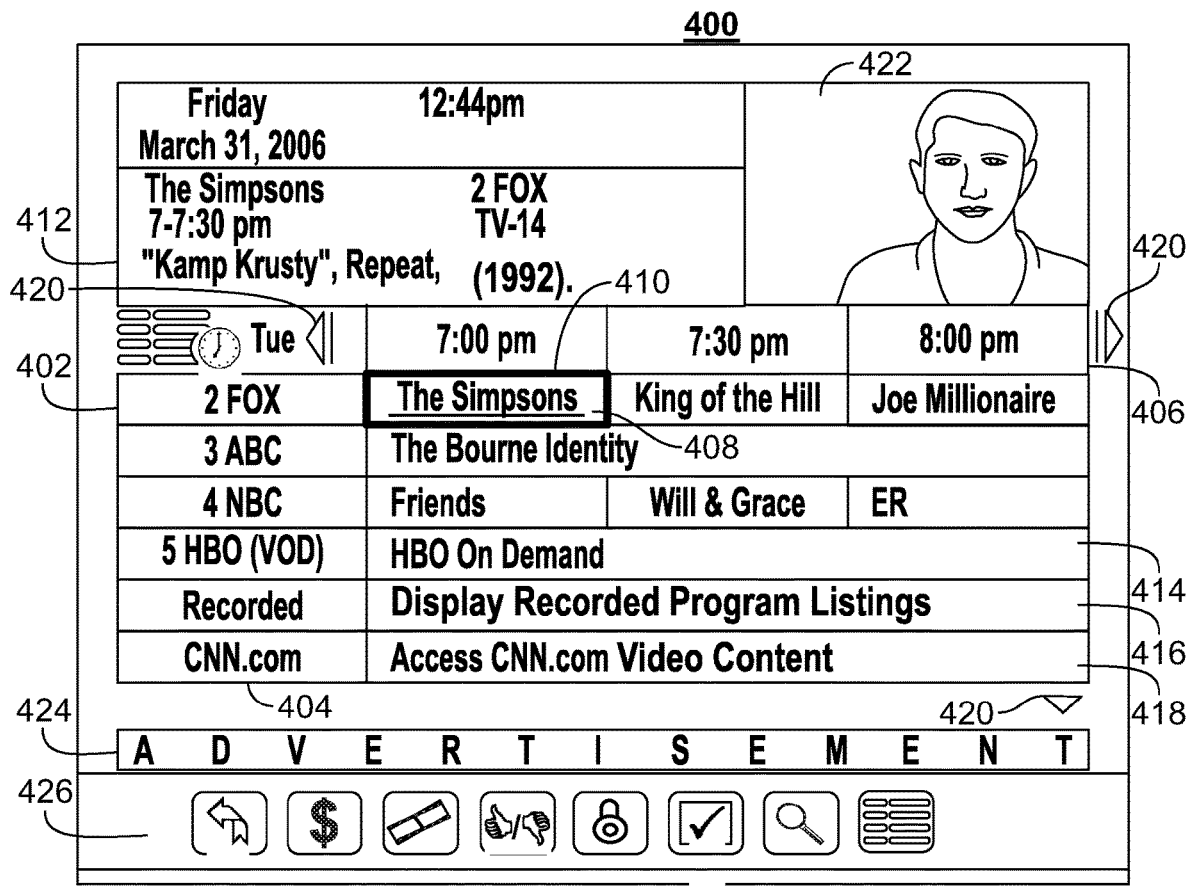
FIGS. 4 and 5 show illustrative examples of display screens generated by a media guidance application in accordance with some embodiments of the disclosure.
Figure 5:
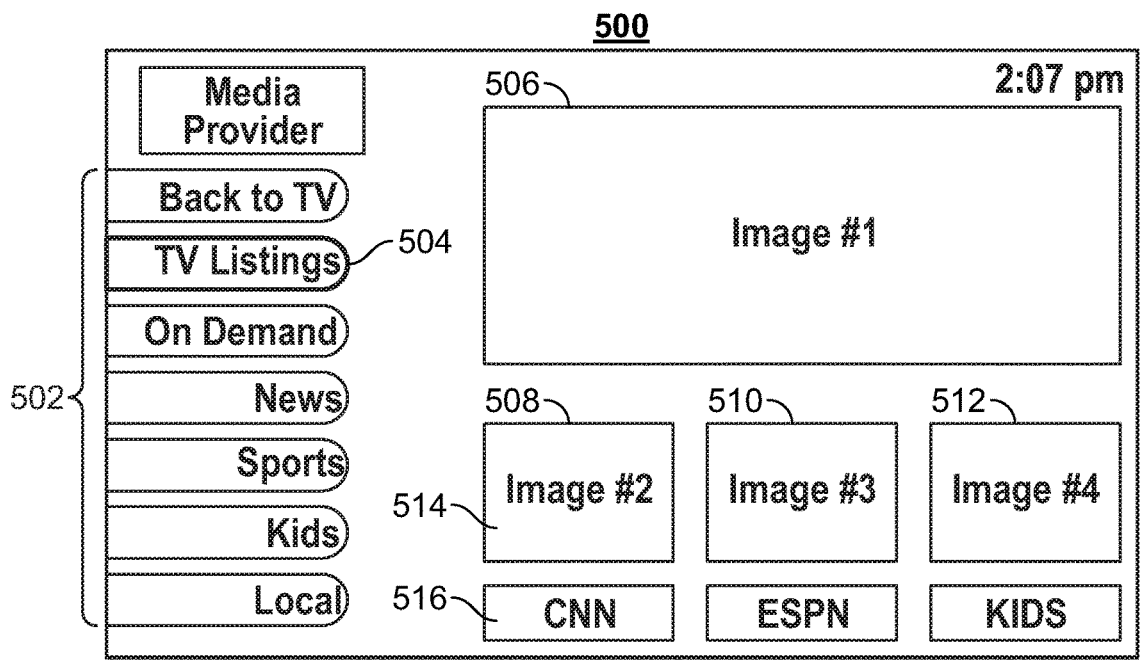

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
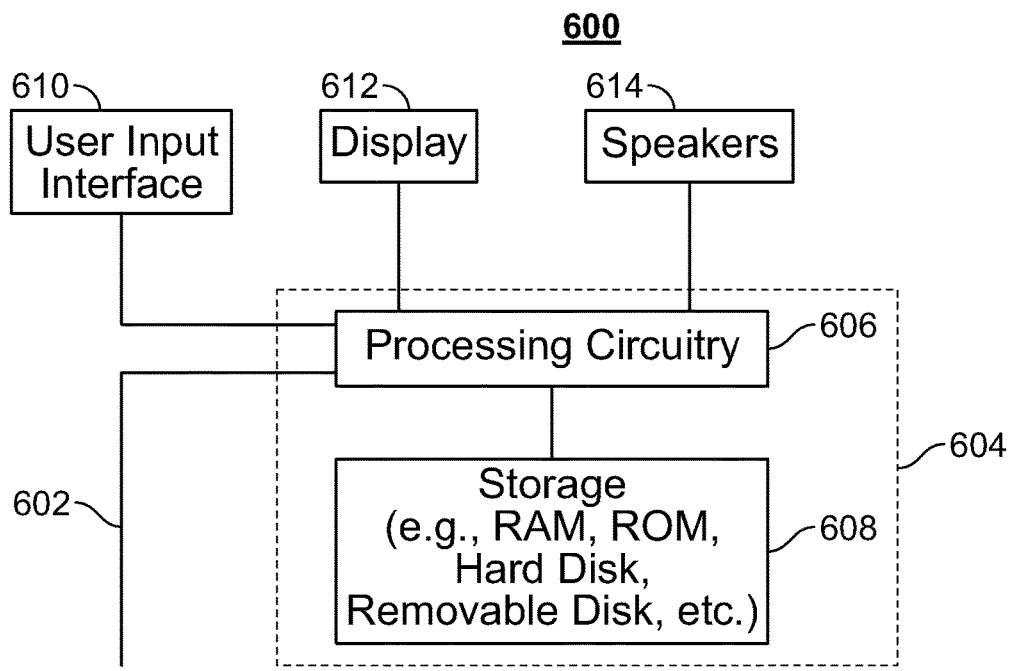
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays.

For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
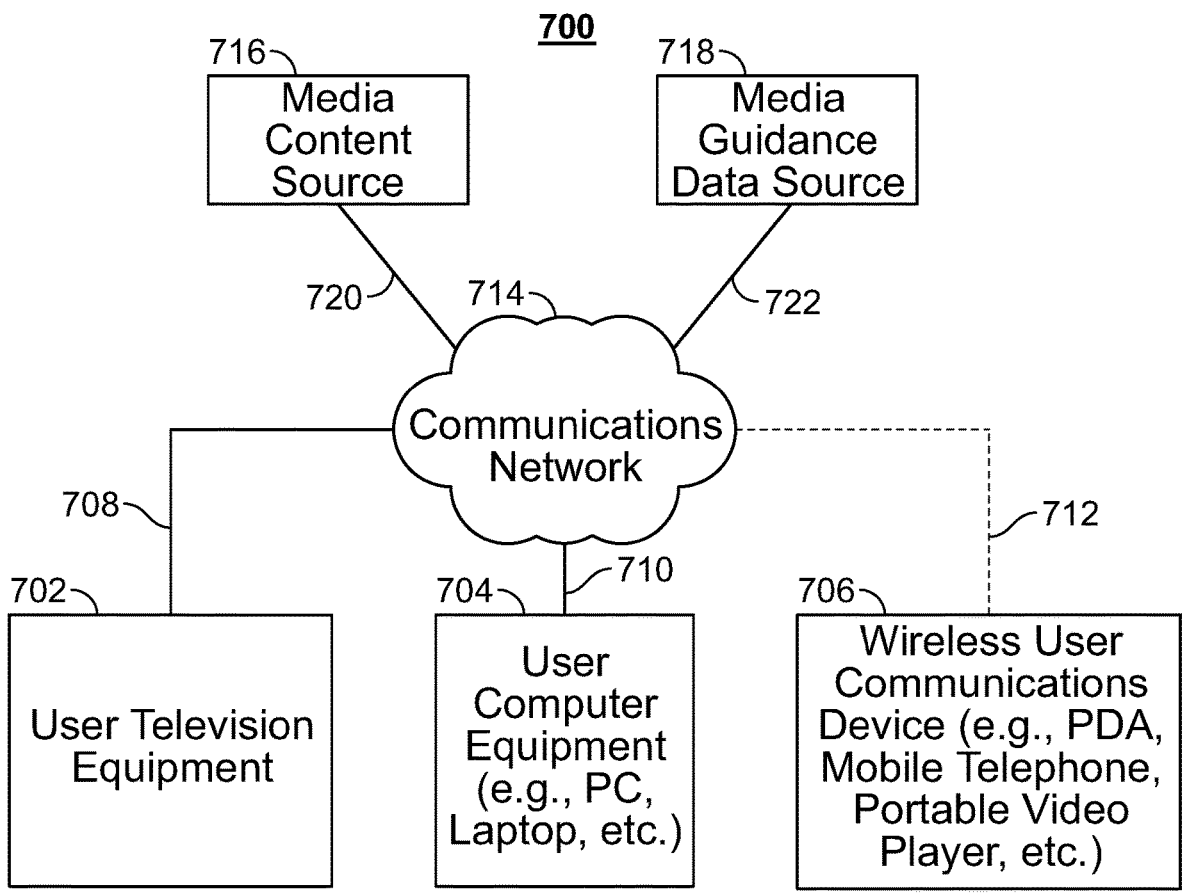
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
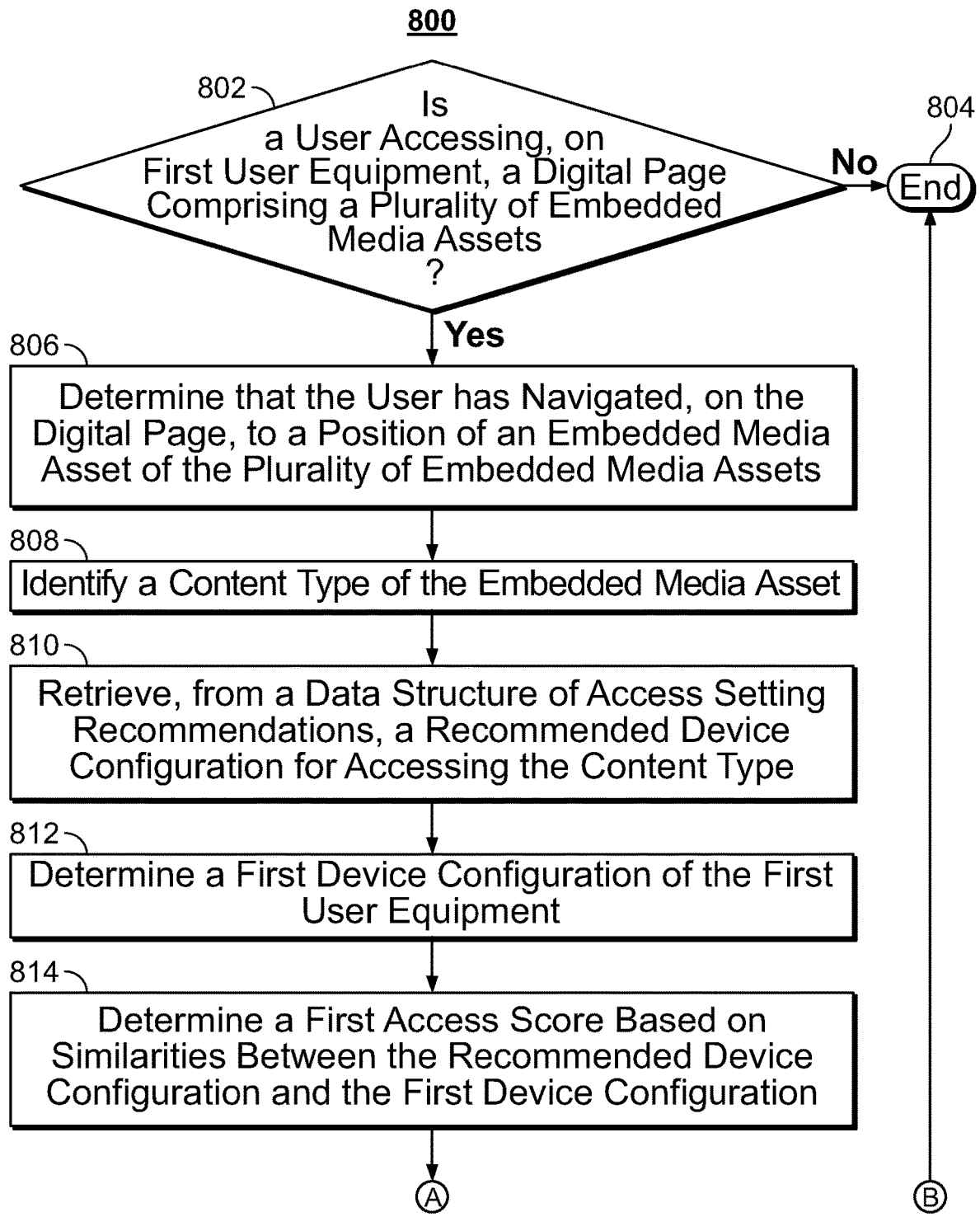
FIG. 8 is a flowchart of an illustrative process for enhancing user experience in accessing media of a certain content type by outputting the media on a nearby device that is better-suited for access, in accordance with some embodiments of the disclosure.
Figure 8:
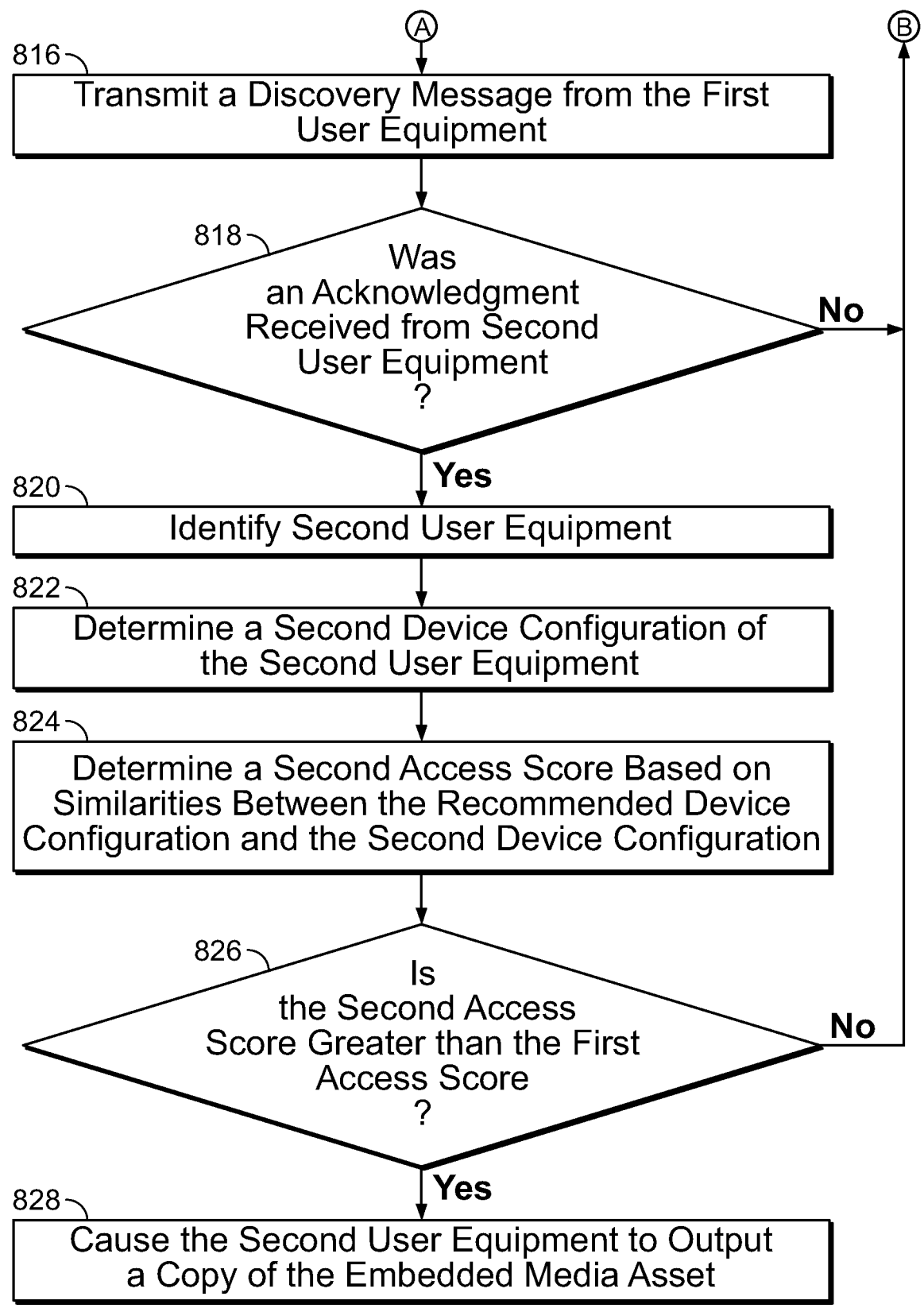

FIG. 8 is a flowchart of an illustrative process for enhancing user experience in accessing media of a certain content type by outputting the media on a nearby device that is better suited for access, in accordance with some embodiments of the disclosure. It should be noted that process 800 or any step thereof could be performed on, or provided by, any of the devices shown in FIGS. 6-7. For example, process 800 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 800 may be incorporated into or combined with one or more steps of any other process or embodiment (e.g., as described in relation to FIGS. 9-17). Many elements of process 800 have been described above with respect to FIGS. 1, 2, and 3, and those descriptions have full force and effect with respect to the below description of process 800, and thus details on previously-described elements are omitted for the sake of brevity.

At 802, control circuitry 604 determines whether a user is accessing, on first user equipment (e.g., user television equipment 702, user computer equipment 704, wireless user equipment 706), a digital page comprising a plurality of embedded media assets. In response to determining that the user is not accessing, on first user equipment, digital page 103 comprising the plurality of embedded media assets, process 800 ends at 804. In response to determining that the user is accessing, on first user equipment, digital page 103 comprising the plurality of embedded media assets, at step 806, control circuitry 604 determines that the user has navigated, on digital page 103, to a position of an embedded media asset of the plurality of embedded media assets (e.g., via user input interface 610). At 808, control circuitry 604 identifies a content type of the embedded media asset. At 810, control circuitry 604 retrieves, from a data structure of access setting recommendations (e.g., in storage 608), a recommended device configuration for accessing the content type. At 812, control circuitry 604 determines a first device configuration of the first user equipment (e.g., based on processing circuitry 606 and storage 608). At 814, control circuitry 604 determines a first access score based on similarities between the recommended device configuration and the first device configuration. At 816, control circuitry 604 transmits a discovery message from the first user equipment (e.g., via I/O Path 602). At 818, control circuitry 604 determines whether an acknowledgment message was received from second user equipment (e.g., over communications network 714). If no acknowledgment message was received, control circuitry 604 outputs the embedded media asset on first user equipment (e.g., using display 612 and/or speakers 614) and process 800 ends at 804. If an acknowledgment was received, control circuitry 604 identifies second user equipment (e.g., user television equipment 702, user computer equipment 704, wireless user equipment 706), at 820. At 822, control circuitry 604 determines a second device configuration of the second user equipment (e.g., based on processing circuitry 606 and storage 608 of the second user equipment). At 824, control circuitry 604 determines a second access score based on similarities between the recommended device configuration and the second device configuration. At 826, control circuitry 604 determines whether the second access score is greater than or equal to the first access score. In response to determining that the second access score is not greater than or equal to the first access score, control circuitry 604 outputs the embedded media asset on the first user equipment and process 800 ends at 804. At 828, in response to determining that the second access score is greater than or equal to the first access score, control circuitry 604 causes the second user equipment to output a copy of the embedded media asset (e.g., using display 612 and/or speakers 614 of the second user equipment).

Figure 9:
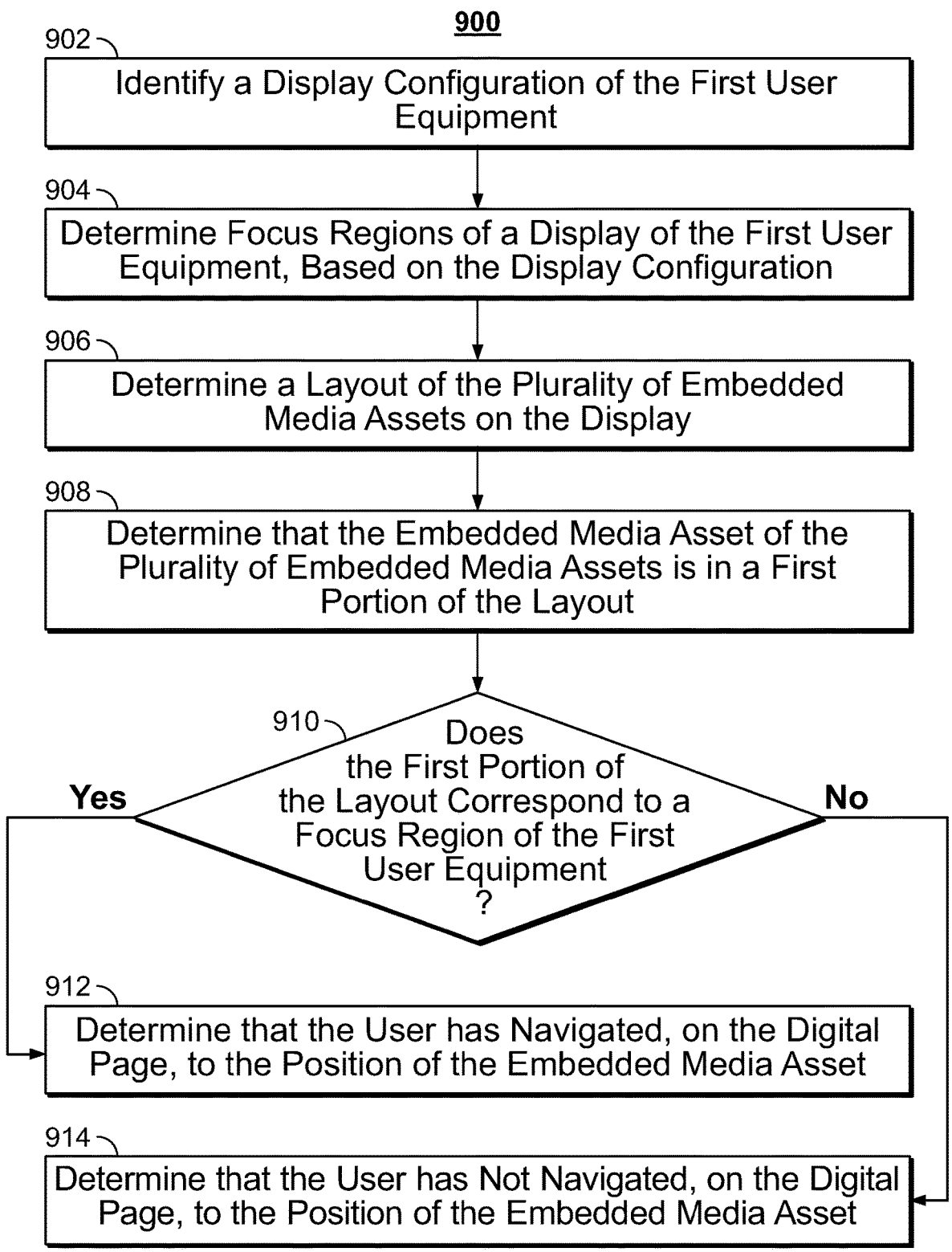
FIG. 9 is a flowchart of a detailed illustrative process for determining, based on focus regions, whether the user has navigated to the position of the embedded media asset, in accordance with some embodiments of the disclosure.

FIG. 9 is a flowchart of a detailed illustrative process for determining, based on focus regions, whether the user has navigated to the position of the embedded media asset, in accordance with some embodiments of the disclosure. It should be noted that process 900 or any step thereof could be performed on, or provided by, any of the devices shown in FIGS. 6-7. For example, process 900 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 900 may be incorporated into or combined with one or more steps of any other process or embodiment (e.g., as described in relation to FIGS. 8 and 10-17). Many elements of process 900 have been described above with respect to FIGS. 1, 2, and 3, and those descriptions have full force and effect with respect to the below description of process 900, and thus details on previously-described elements are omitted for the sake of brevity.

At 902, control circuitry 604 identifies a display configuration of the first user equipment (e.g., based on processing circuitry 606 and storage 608). At 904, control circuitry 604 determines focus regions of display 612 of the first user equipment, based on the display configuration. At 906, control circuitry 604 determines a layout of the plurality of embedded media assets on display 612. At 908, control circuitry 604 determines that the embedded media asset of the plurality of embedded media assets is in a first portion of the layout. At 910, control circuitry 604 determines whether the first portion of the layout corresponds to a focus region of the first user equipment. In response to determining that the first portion of the layout corresponds to a focus region, control circuitry 604 determines that the user has navigated, on digital page 103, to the position of the embedded media asset (e.g., using user input interface 610), at 912. In response to determining that the first portion of the layout does not correspond to a focus region, control circuitry 604 determines that the user has not navigated, on digital page 103, to the position of the embedded media asset, at 914.

Figure 10:
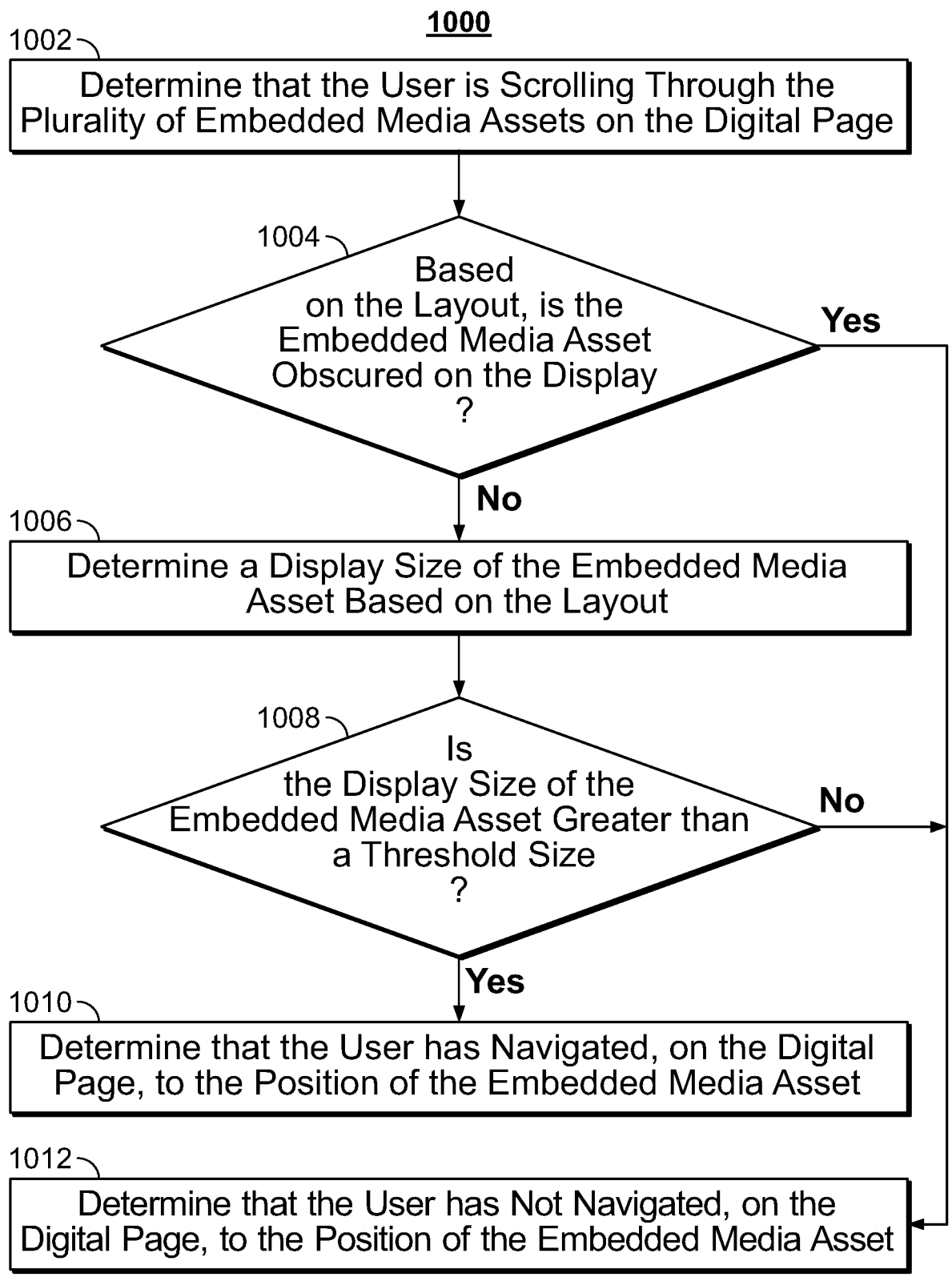
FIG. 10 is a flowchart of a detailed illustrative process for determining, based on display sizes of embedded media assets, whether the user has navigated to the position of the embedded media asset, in accordance with some embodiments of the disclosure.

FIG. 10 is a flowchart of a detailed illustrative process for determining, based on display sizes of embedded media assets, whether the user has navigated to the position of the embedded media asset, in accordance with some embodiments of the disclosure. It should be noted that process 1000 or any step thereof could be performed on, or provided by, any of the devices shown in FIGS. 6-7. For example, process 1000 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1000 may be incorporated into or combined with one or more steps of any other process or embodiment (e.g., as described in relation to FIGS. 8-9 and 11-17). Many elements of process 1000 have been described above with respect to FIGS. 1, 2, and 3, and those descriptions have full force and effect with respect to the below description of process 1000, and thus details on previously-described elements are omitted for the sake of brevity.

At 1002, control circuitry 604 determines that the user is scrolling through the plurality of embedded media assets on digital page 103 (e.g., using user input interface 610). At 1004, control circuitry 604 determines, based on the layout, whether the embedded media asset is obscured on display 612. In response to determining that the embedded media asset is not obscured, control circuitry 604 determines a display size of the embedded media asset based on the layout, at 1006. In response to determining that the embedded media asset is obscured, control circuitry 604 determines that the user has not navigated, on digital page 103, to the position of the embedded media asset, at 1012. At 1008, control circuitry 604 determines whether the display size of the embedded media asset is greater than a threshold size (e.g., retrieved from storage 608). In response to determining that the display size is greater than the threshold size, control circuitry 604 determines that the user has navigated, on digital page 103, to the position of the embedded media asset, at 1010. Otherwise, control circuitry 604 determines that the user has not navigated, on digital page 103, to the position of the embedded media asset, at 1012.

Figure 11:
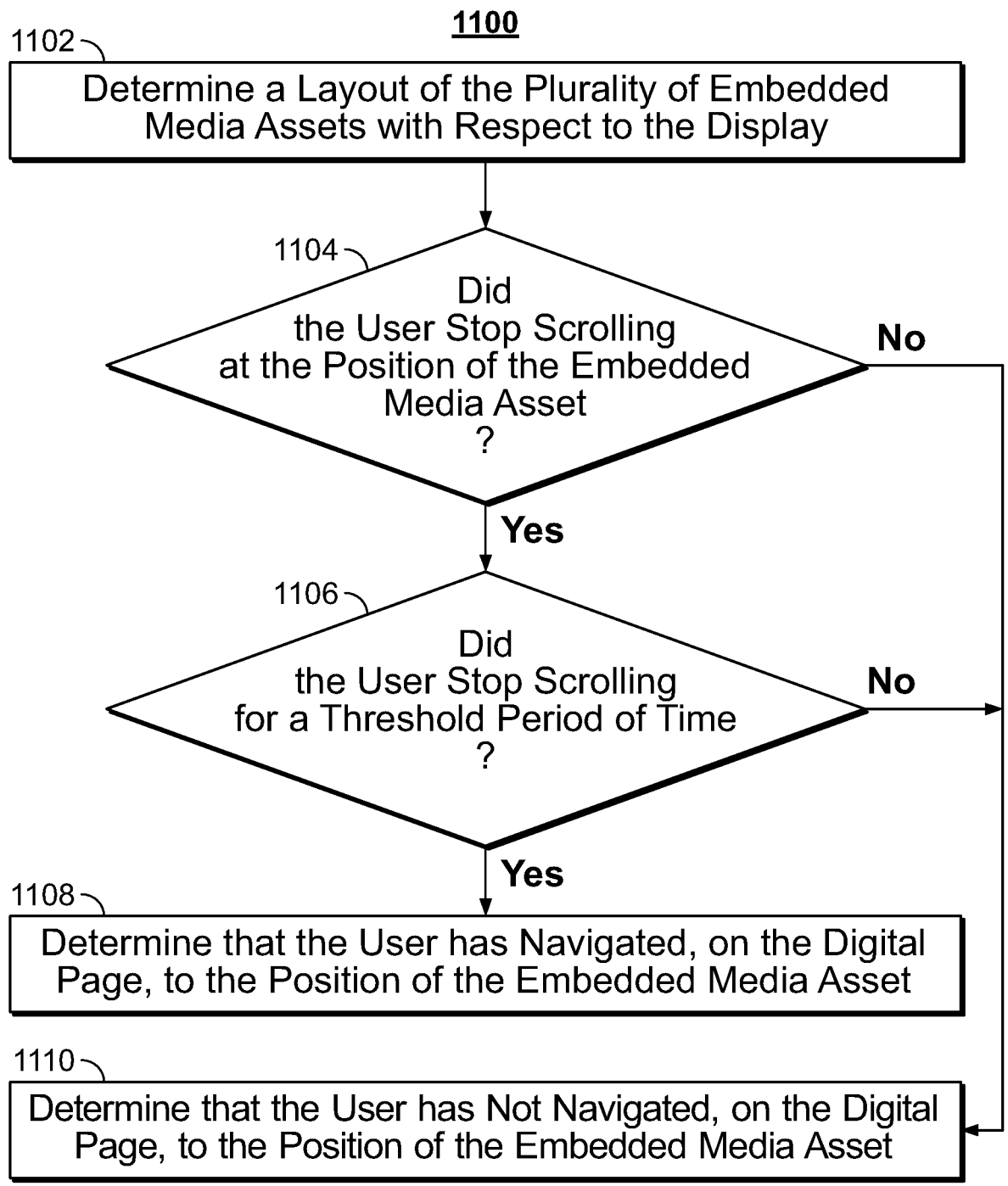
FIG. 11 is a flowchart of a detailed illustrative process for determining, based on the user's scrolling input, whether the user has navigated to the position of the embedded media asset, in accordance with some embodiments of the disclosure.

FIG. 11 is a flowchart of a detailed illustrative process for determining, based on the user's scrolling input, whether the user has navigated to the position of the embedded media asset, in accordance with some embodiments of the disclosure. It should be noted that process 1100 or any step thereof could be performed on, or provided by, any of the devices shown in FIGS. 6-7. For example, process 1100 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1100 may be incorporated into or combined with one or more steps of any other process or embodiment (e.g., as described in relation to FIGS. 8-10 and 12-17). Many elements of process 1100 have been described above with respect to FIGS. 1, 2, and 3, and those descriptions have full force and effect with respect to the below description of process 1100, and thus details on previously-described elements are omitted for the sake of brevity.

At 1102, control circuitry 604 determines a layout of the plurality of embedded media assets with respect to display 612. At 1104, control circuitry 604 determines whether the user stopped scrolling at the position of the embedded media asset (e.g., via user input interface 610). In response to determining that the user stopped scrolling, control circuitry 604 determines whether the user stopped scrolling for a threshold period of time (e.g., retrieved from storage 608), at 1106. In response to determining that the user stopped scrolling for the threshold period of time, control circuitry 604 determines that the user has navigated, on digital page 103, to the position of the embedded media asset. Otherwise, if control circuitry 604 determines the opposite result at 1104 or 1106, control circuitry 604 determines that the user has not navigated, on digital page 103, to the position of the embedded media asset at 1110.

Figure 12:
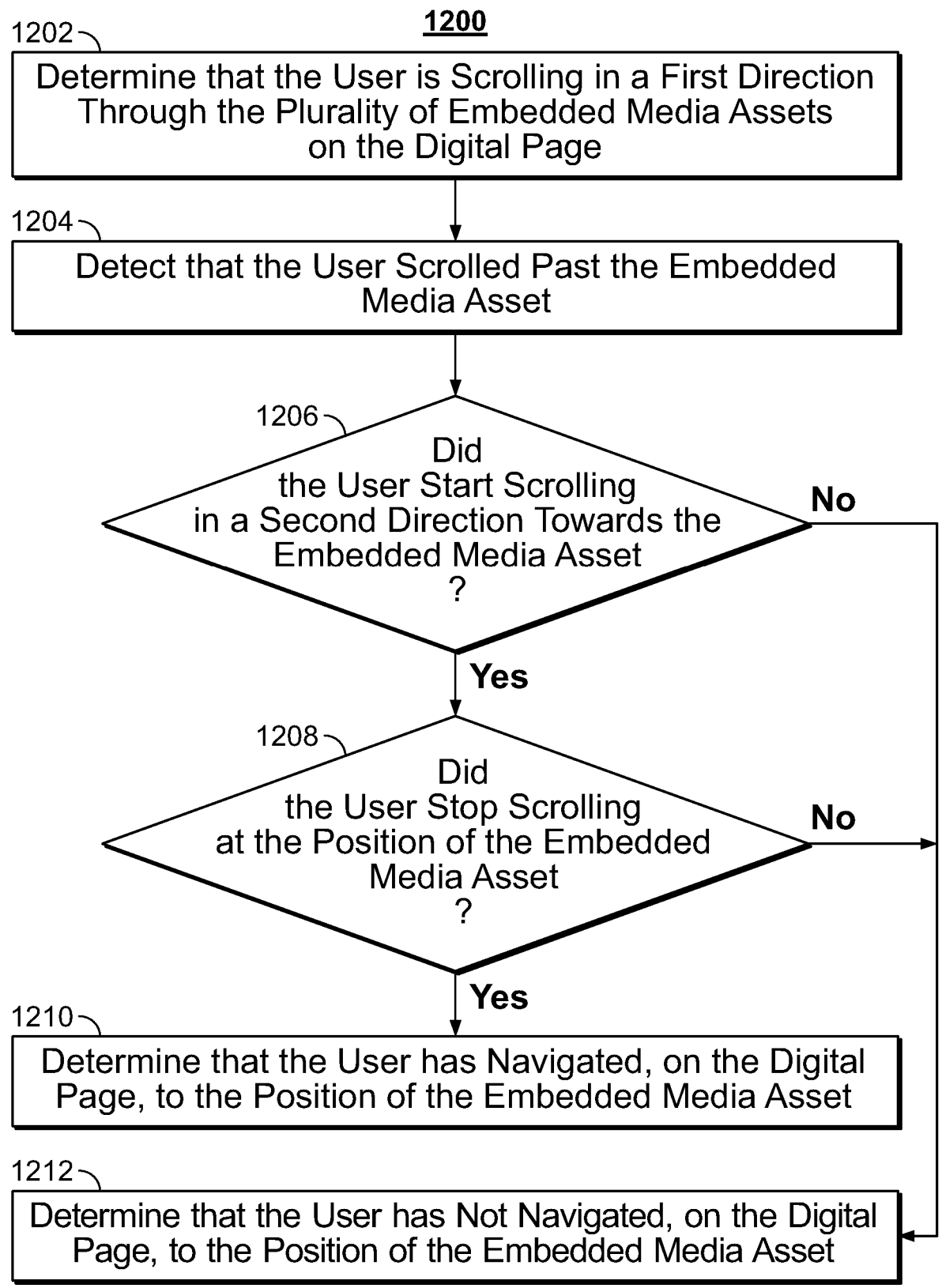
FIG. 12 is a flowchart of a detailed illustrative process for determining, based on the user's scroll-back input, whether the user has navigated to the position of the embedded media asset, in accordance with some embodiments of the disclosure.

FIG. 12 is a flowchart of a detailed illustrative process for determining, based on the user's scroll-back input, whether the user has navigated to the position of the embedded media asset, in accordance with some embodiments of the disclosure. It should be noted that process 1200 or any step thereof could be performed on, or provided by, any of the devices shown in FIGS. 6-7. For example, process 1200 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1200 may be incorporated into or combined with one or more steps of any other process or embodiment (e.g., as described in relation to FIGS. 8-11 and 13-17). Many elements of process 1200 have been described above with respect to FIGS. 1, 2, and 3, and those descriptions have full force and effect with respect to the below description of process 1200, and thus details on previously-described elements are omitted for the sake of brevity.

At 1202, control circuitry 604 determines that the user is scrolling in a first direction through the plurality of embedded media assets on digital page 103 (e.g., via user input interface 610). At 1204, control circuitry 604 detects that the user scrolled past the embedded media asset. At 1206, control circuitry 604 determines whether the user started scrolling in a second direction towards the embedded media asset (e.g., via user input interface 610). If yes, control circuitry 604 determines whether the user stopped scrolling at the position of the embedded media asset, at 1208. If yes, control circuitry 604 determines that the user has navigated, on digital page 103, to the position of the embedded media asset, at 1210. If at 1206 or 1208, the result is "no," control circuitry 604 determines that the user has not navigated, on digital page 103, to the position of the embedded media asset, at 1212.

Figure 13:
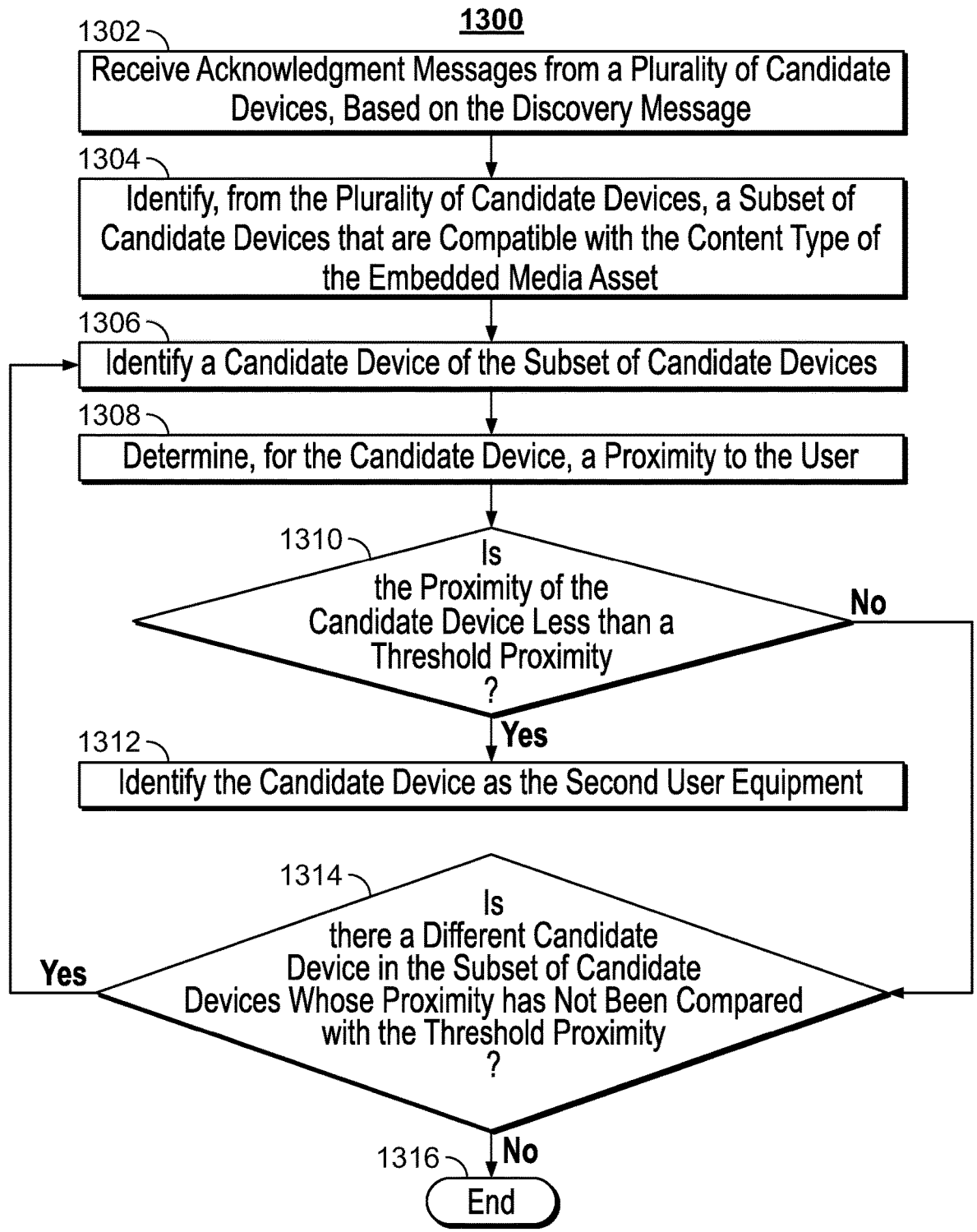
FIG. 13 is a flowchart of a detailed illustrative process for identifying, based on the proximities of a plurality of candidate devices, the second user equipment, in accordance with some embodiments of the disclosure.

FIG. 13 is a flowchart of a detailed illustrative process for identifying, based on the proximities of a plurality of candidate devices, the second user equipment, in accordance with some embodiments of the disclosure. It should be noted that process 1300 or any step thereof could be performed on, or provided by, any of the devices shown in FIGS. 6-7. For example, process 1300 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1300 may be incorporated into or combined with one or more steps of any other process or embodiment (e.g., as described in relation to FIGS. 8-12 and 14-17). Many elements of process 1300 have been described above with respect to FIGS. 1, 2, and 3, and those descriptions have full force and effect with respect to the below description of process 1300, and thus details on previously-described elements are omitted for the sake of brevity.

At 1302, control circuitry 604 receives acknowledgment messages from a plurality of candidate devices, based on the discovery message (e.g., received via I/O Path 602 over communications network 714). At 1304, control circuitry 604 identifies, from the plurality of candidate devices, a subset of candidate devices that are compatible with the content type of the embedded media asset. At 1306, control circuitry 604 identifies a candidate device of the subset of candidate devices. At 1308, control circuitry 604 determines, for the candidate device, a proximity to the user. At 1310, control circuitry 604 determines whether the proximity of the candidate device is less than a threshold proximity (e.g., retrieved from storage 608). If yes, at 1312, control circuitry 604 identifies the candidate device as the second user equipment. If no, at 1314, control circuitry 604 determines whether there is a different candidate device in the subset of candidate devices whose proximity has not been compared with the threshold proximity. If yes, process 1300 returns to 1306. If no, the process ends at 1316.

Figure 14:
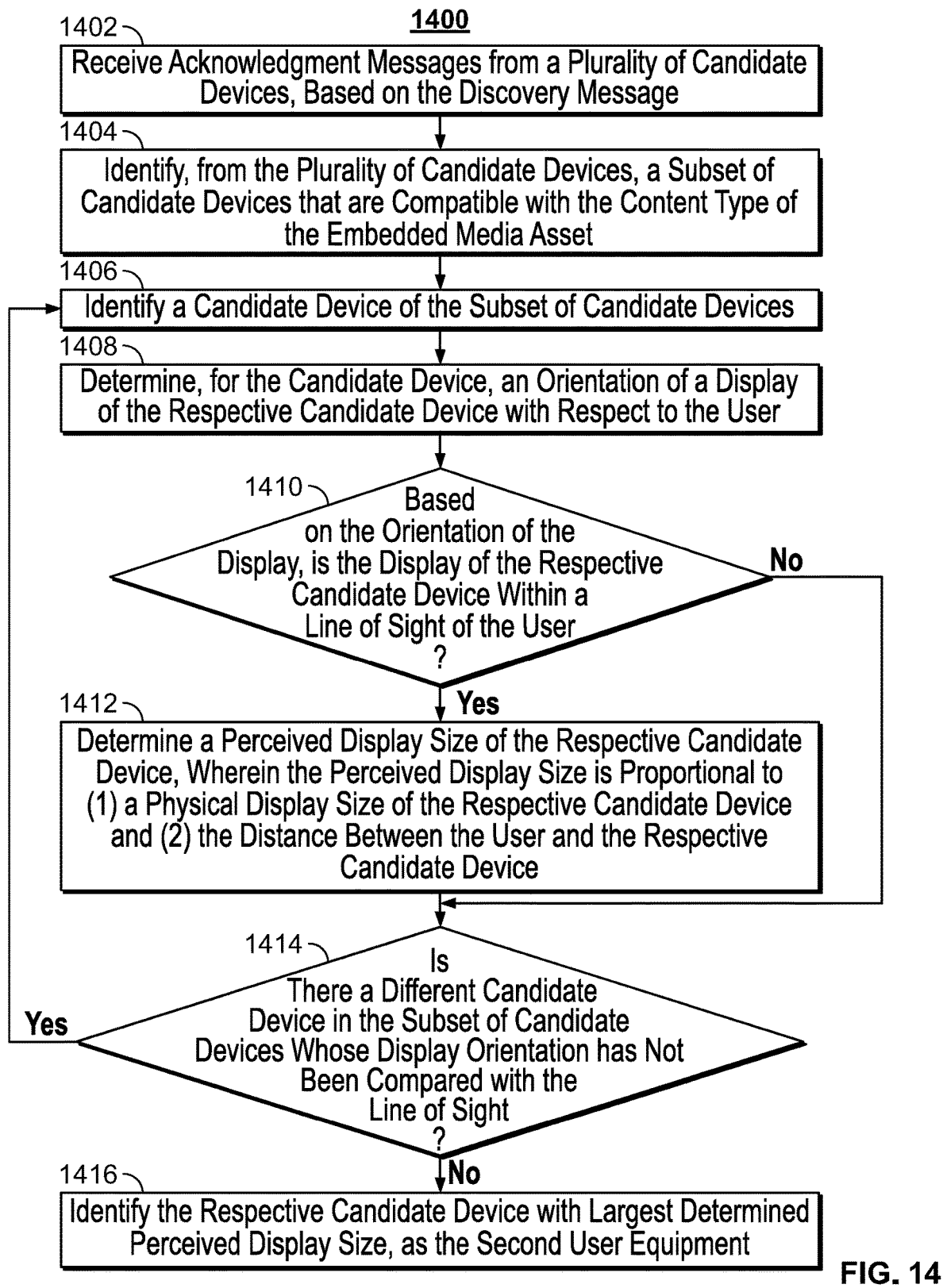
FIG. 14 is a flowchart of an illustrative process for identifying, based on the user's line of sight, the second user equipment, in accordance with some embodiments of the disclosure.

FIG. 14 is a flowchart of an illustrative process for identifying, based on the user's line of sight, the second user equipment, in accordance with some embodiments of the disclosure. It should be noted that process 1400 or any step thereof could be performed on, or provided by, any of the devices shown in FIGS. 6-7. For example, process 1400 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1400 may be incorporated into or combined with one or more steps of any other process or embodiment (e.g., as described in relation to FIGS. 8-13 and 15-17). Many elements of process 1400 have been described above with respect to FIGS. 1, 2, and 3, and those descriptions have full force and effect with respect to the below description of process 1400, and thus details on previously-described elements are omitted for the sake of brevity.

At 1402, control circuitry 604 receives acknowledgment messages from a plurality of candidate devices, based on the discovery message (e.g., received via I/O Path 602 over communications network 714). At 1404, control circuitry 604 identifies, from the plurality of candidate devices, a subset of candidate devices that are compatible with the content type of the embedded media asset. At 1406, control circuitry 604 identifies a candidate device of the subset of candidate devices. At 1408, control circuitry 604 determines, for the candidate device, an orientation of a display of the respective candidate device with respect to the user. At 1410, based on the orientation of the display, control circuitry 604 determines whether the display of the respective candidate device is within a line of sight of the user. If yes, at 1412, control circuitry 604 determines a perceived display size of the respective candidate device, wherein the perceived display size is proportional to (1) a physical display size of the respective candidate device and (2) the distance between the user and the respective candidate device. If "no" and/or in response to 1412, control circuitry 604 determines whether there is a different candidate device in the subset of candidate devices whose display orientation has not been compared with the line of sight. If yes, process 1400 returns to 1406. If no, control circuitry 604 identifies the respective candidate device with largest determined perceived display size, as the second user equipment, at 1416.

Figure 15:
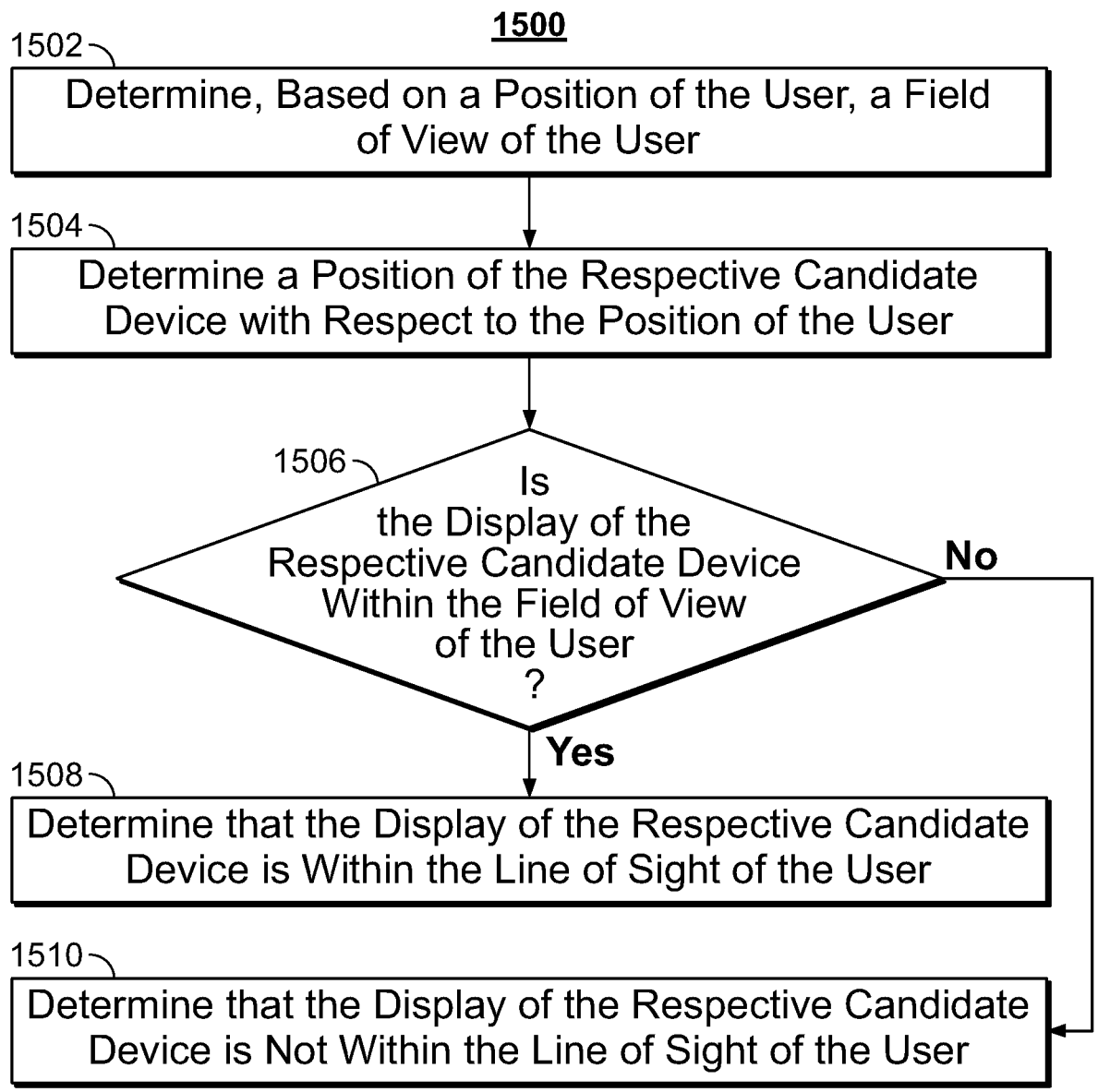
FIG. 15 is a flowchart of a detailed illustrative process for identifying, based on the user's field of view, the second user equipment, in accordance with some embodiments of the disclosure.

FIG. 15 is a flowchart of a detailed illustrative process for identifying, based on the user's field of view, the second user equipment, in accordance with some embodiments of the disclosure. It should be noted that process 1500 or any step thereof could be performed on, or provided by, any of the devices shown in FIGS. 6-7. For example, process 1500 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1500 may be incorporated into or combined with one or more steps of any other process or embodiment (e.g., as described in relation to FIGS. 8-14 and 16-17). Many elements of process 1500 have been described above with respect to FIGS. 1, 2, and 3, and those descriptions have full force and effect with respect to the below description of process 1500, and thus details on previously-described elements are omitted for the sake of brevity.

At 1502, control circuitry 604 determines, based on a position of the user, a field of view of the user. At 1504, control circuitry 604 determines a position of the respective candidate device with respect to the position of the user. At 1506, control circuitry 604 determines whether the display of the respective candidate device is within the field of view of the user. If yes, control circuitry 604 determines that the display of the respective candidate device is within the line of sight of the user, at 1508. If no, control circuitry 604 determines that the display of the respective candidate device is not within the line of sight of the user.

Figure 16:
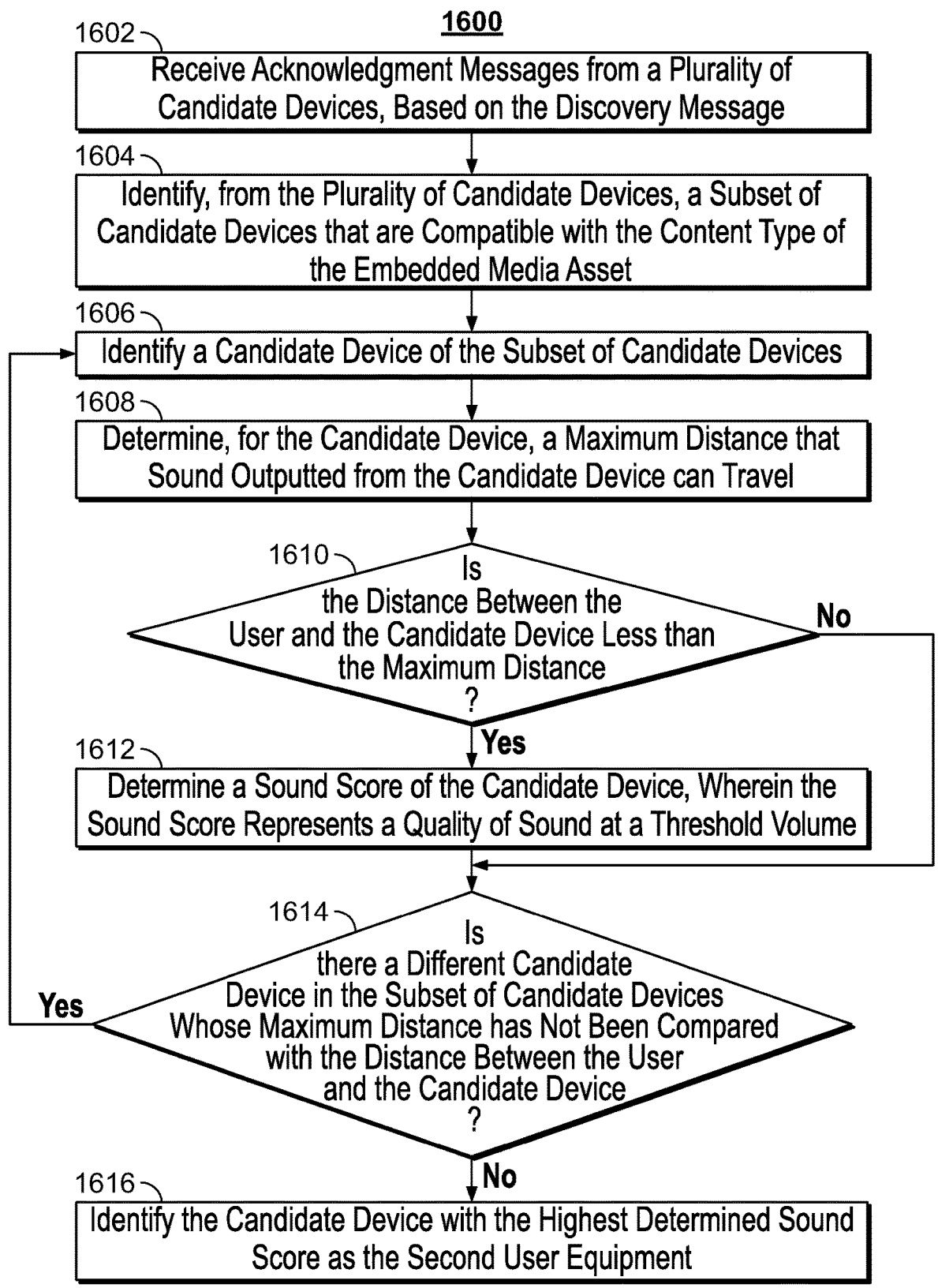
FIG. 16 is a flowchart of a detailed illustrative process for identifying, based on the sound scores of the plurality of candidate devices, the second user equipment, in accordance with some embodiments of the disclosure.

FIG. 16 is a flowchart of a detailed illustrative process for identifying, based on the sound scores of the plurality of candidate devices, the second user equipment, in accordance with some embodiments of the disclosure. It should be noted that process 1600 or any step thereof could be performed on, or provided by, any of the devices shown in FIGS. 6-7. For example, process 1600 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1600 may be incorporated into or combined with one or more steps of any other process or embodiment (e.g., as described in relation to FIGS. 8-15 and 17). Many elements of process 1600 have been described above with respect to FIGS. 1, 2, and 3, and those descriptions have full force and effect with respect to the below description of process 1600, and thus details on previously-described elements are omitted for the sake of brevity.

At 1602, control circuitry 604 receives acknowledgment messages from a plurality of candidate devices, based on the discovery message (e.g., received via I/O Path 602 over communications network 714). At 1604, control circuitry 604 identifies, from the plurality of candidate devices, a subset of candidate devices that are compatible with the content type of the embedded media asset. At 1606, control circuitry 604 identifies a candidate device of the subset of candidate devices. At 1608, control circuitry 604 determines, for the candidate device, a maximum distance that sound outputted from the candidate device can travel. At 1610, control circuitry 604 determines whether the distance between the user and the candidate device is less than the maximum distance. If yes, control circuitry 604 determines a sound score of the candidate device, wherein the sound score represents a quality of sound at a threshold volume (e.g., retrieved from storage 608). If "no" and/or in response to 1612, control circuitry 604 determines whether there is a different candidate device in the subset of candidate devices whose maximum distance has not been compared with the distance between the user and the candidate device, at 1614. If yes, process 1600 returns to 1606. If no, control circuitry 604 identifies the candidate device with the highest determined sound score as the second user equipment, at 1616.

Figure 17:
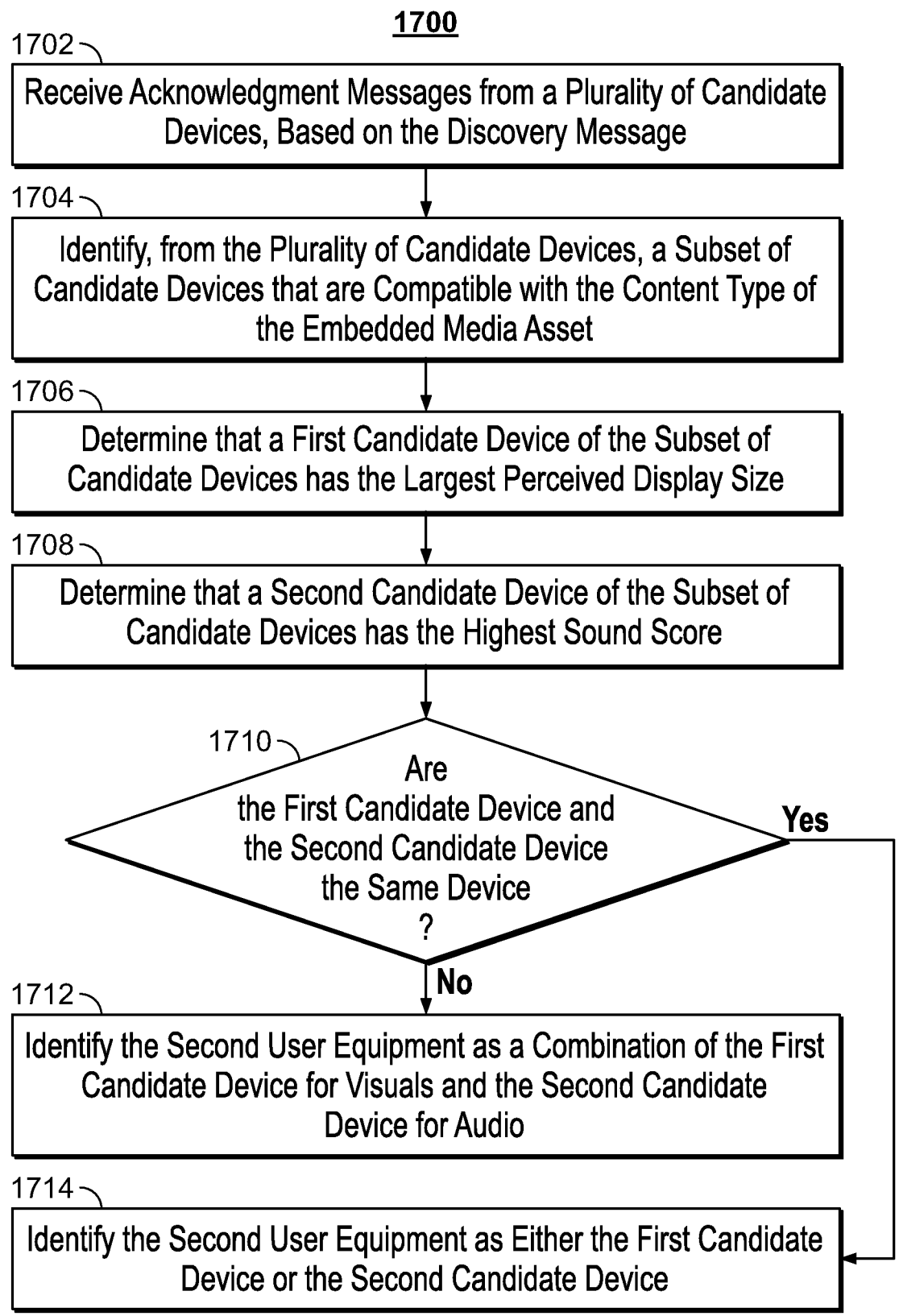
FIG. 17 is a flowchart of a detailed illustrative process for identifying a combination of candidate devices as the second user equipment, in accordance with some embodiments of the disclosure.

FIG. 17 is a flowchart of a detailed illustrative process for identifying a combination of candidate devices as the second user equipment, in accordance with some embodiments of the disclosure. It should be noted that process 1700 or any step thereof could be performed on, or provided by, any of the devices shown in FIGS. 6-7. For example, process 1700 may be executed by control circuitry 604 (FIG. 6) as instructed by a media guidance application implemented on user equipment 108 (which may have the functionality of any or all of user equipment 702, 704, and/or 706 (FIG. 7)). In addition, one or more steps of process 1700 may be incorporated into or combined with one or more steps of any other process or embodiment (e.g., as described in relation to FIGS. 8-16). Many elements of process 1700 have been described above with respect to FIGS. 1, 2, and 3, and those descriptions have full force and effect with respect to the below description of process 1700, and thus details on previously-described elements are omitted for the sake of brevity.

At 1702, control circuitry 604 receives acknowledgment messages from a plurality of candidate devices, based on the discovery message (e.g., received via I/O Path 602 over communications network 714). At 1704, control circuitry 604 identifies, from the plurality of candidate devices, a subset of candidate devices that are compatible with the content type of the embedded media asset. At 1706, control circuitry 604 determines that a first candidate device of the subset of candidate devices has the biggest perceived display size. At 1708, control circuitry 604 determines that a second candidate device of the subset of candidate devices has the highest sound score. At 1710, control circuitry 604 determines whether the first candidate device and the second candidate device are the same device. If the respective devices are not the same, control circuitry 604 identifies the second user equipment as a combination of the first candidate device for visuals and the second candidate device for audio. If yes, control circuitry 604 identifies the second user equipment as either the first candidate device or the second candidate device.

It is contemplated that the steps or descriptions of each of FIGS. 7-19 may be used with any other embodiment of this disclosure. In addition, the steps and descriptions described in relation to FIGS. 8-17 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1, 2, 3 and 6-7 could be used to perform one or more of the steps in FIGS. 8-17.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for enhancing user experience in accessing media of a certain content type by outputting the media on a nearby device that is better suited for access, the method comprising:
    determining that a user is accessing, on first user equipment, a digital page comprising a plurality of embedded media assets;
    determining that the user has navigated, on the digital page, to a position of an embedded media asset of the plurality of embedded media assets; and
    in response to determining that the user has navigated, on the digital page, to the position of the embedded media asset:
        identifying a content type of the embedded media asset;
        retrieving, from a data structure of access setting recommendations, a recommended device configuration for accessing the content type;
        determining a first device configuration of the first user equipment;
        determining a first access score based on similarities between the recommended device configuration and the first device configuration;
        transmitting a discovery message from the first user equipment;
        in response to transmitting the discovery message, identifying second user equipment;
        determining a second device configuration of the second user equipment;
        determining a second access score based on similarities between the recommended device configuration and the second device configuration;
        determining whether the second access score is greater than the first access score; and
        in response to determining that the second access score is greater than the first access score, causing the second user equipment to output a copy of the embedded media asset.

2. The method of claim 1, wherein determining that the user has navigated, on the digital page, to the position of the embedded media asset further comprises:
    determining that the user is scrolling through the plurality of embedded media assets on the digital page;
    detecting that the user has stopped scrolling at the position of the embedded media asset;
    determining that the user has stopped scrolling for a threshold period of time; and
    in response to determining that the user has stopped scrolling for the threshold period of time, determining that the user has navigated, on the digital page, to the position of the embedded media asset.

3. The method of claim 1, wherein determining that the user has navigated, on the digital page, to the position of the embedded media asset further comprises:
    determining that the user is scrolling in a first direction through the plurality of embedded media assets on the digital page;
    detecting that the user scrolled past the embedded media asset;
    subsequent to detecting that the user scrolled past the embedded media asset, determining that the user is scrolling in a second direction, wherein the second direction is towards the embedded media asset;
    determining that the user has stopped scrolling at the position of the embedded media asset; and
    in response to determining that the user stopped scrolling at the position of the embedded media asset, determining that the user has navigated, on the digital page, to the position of the embedded media asset.

4. The method of claim 1, wherein identifying the second user equipment further comprises:
    receiving acknowledgment messages from a plurality of candidate devices, based on the discovery message;
    identifying, from the plurality of candidate devices, a subset of candidate devices that are compatible with the content type of the embedded media asset;
    for each candidate device of the subset of candidate devices, determining a proximity to the user;
    in response to determining that the proximity to the user of a respective candidate device is less than a threshold proximity, identifying the respective candidate device as the second user equipment.

5. The method of claim 1, wherein the content type is associated with visuals, wherein identifying the second user equipment further comprises:
    receiving acknowledgment messages from a plurality of candidate devices, based on the discovery message;
    identifying, from the plurality of candidate devices, a subset of candidate devices that are compatible with the content type of the embedded media asset;
    for each candidate device of the subset of candidate devices:
        determining an orientation of a display of the respective candidate device with respect to the user;
        determining whether the display of the respective candidate device is within a line of sight of the user, based on the orientation of the display; and
        in response to determining that the display of the respective candidate device is within the line of sight of the user, determining a perceived display size of the respective candidate device, wherein the perceived display size is proportional to (1) a physical display size of the respective candidate device and (2) the distance between the user and the respective candidate device; and in response to determining that the determined perceived display size of the second user equipment device of the subset of candidate devices is the largest of perceived display sizes of the subset of candidate devices, identifying the second user equipment.

6. The method of claim 1, wherein the content type is associated with audio, wherein identifying the second user equipment further comprises:

receiving acknowledgment messages from a plurality of candidate devices, based on the discovery message;

identifying, from the plurality of candidate devices, a subset of candidate devices that are compatible with the content type of the embedded media asset;

for each candidate device of the subset of candidate devices:

determining a maximum distance that sound outputted from the respective candidate device can travel; and in response to determining that the distance between the user and the respective candidate device is less than the maximum distance, determining a sound score of the respective candidate device, wherein the sound score represents a quality of sound at a threshold volume; and in response to determining that the sound score of the second user equipment device of the subset of candidate devices is the highest of sound scores of the subset of candidate devices, identifying the second user equipment.

7. The method of claim 1, wherein the content type is associated with audio and visuals, and wherein identifying the second user equipment further comprises:

receiving acknowledgment messages from a plurality of candidate devices, based on the discovery message;

identifying, from the plurality of candidate devices, a subset of candidate devices that are compatible with the content type of the embedded media asset;

determining that a first candidate device of the subset of candidate devices has a perceived display size that is greater than a threshold size;

determining that a second candidate device, different from the first candidate device, of the subset of candidate devices has a sound score that is greater than a sound threshold;

in response to determining that (1) the first candidate device has the perceived display size that is greater than the threshold size and (2) the second candidate device has the sound score that is greater than the sound threshold, identifying the second user equipment as a combination of the first candidate device for visuals and the second candidate device for audio.

8. A system for enhancing user experience in accessing media of a certain content type by outputting the media on a nearby device that is better suited for access, the system comprising:

control circuitry configured to:

determine that a user is accessing, on first user equipment, a digital page comprising a plurality of embedded media assets;

determine that the user has navigated, on the digital page, to a position of an embedded media asset of the plurality of embedded media assets; and in response to determining that the user has navigated, on the digital page, to the position of the embedded media asset:

identify a content type of the embedded media asset;

retrieve, from a data structure of access setting recommendations, a recommended device configuration for accessing the content type;

determine a first device configuration of the first user equipment;

determine a first access score based on similarities between the recommended device configuration and the first device configuration;

transmit a discovery message from the first user equipment;

in response to transmitting the discovery message, identify second user equipment;

determine a second device configuration of the second user equipment;

determine a second access score based on similarities between the recommended device configuration and the second device configuration;

determine whether the second access score is greater than the first access score; and in response to determining that the second access score is greater than the first access score, cause the second user equipment to output a copy of the embedded media asset.

9. The system of claim 8, wherein the control circuitry, when determining that the user has navigated, on the digital page, to the position of the embedded media asset, is further configured to:

determine that the user is scrolling through the plurality of embedded media assets on the digital page;

detect that the user has stopped scrolling at the position of the embedded media asset;

determine that the user has stopped scrolling for a threshold period of time; and in response to determining that the user has stopped scrolling for the threshold period of time, determine that the user has navigated, on the digital page, to the position of the embedded media asset.

10. The system of claim 8, wherein the control circuitry, when determining that the user has navigated, on the digital page, to the position of the embedded media asset, is further configured to:

determine that the user is scrolling in a first direction through the plurality of embedded media assets on the digital page;

detect that the user scrolled past the embedded media asset;

subsequent to detecting that the user scrolled past the embedded media asset, determine that the user is scrolling in a second direction, wherein the second direction is towards the embedded media asset;

determine that the user has stopped scrolling at the position of the embedded media asset; and in response to determining that the user stopped scrolling at the position of the embedded media asset, determine that the user has navigated, on the digital page, to the position of the embedded media asset.

11. The system of claim 8, wherein the control circuitry, when identifying the second user equipment, is further configured to:

receive acknowledgment messages from a plurality of candidate devices, based on the discovery message;

identify, from the plurality of candidate devices, a subset of candidate devices that are compatible with the content type of the embedded media asset;

for each candidate device of the subset of candidate devices, determine a proximity to the user;

in response to determining that the proximity to the user of a respective candidate device is less than a threshold proximity, identify the respective candidate device as the second user equipment.

12. The system of claim 8, wherein the content type is associated with visuals, wherein the control circuitry, when identifying the second user equipment, is further configured to:

receive acknowledgment messages from a plurality of candidate devices, based on the discovery message;

identify, from the plurality of candidate devices, a subset of candidate devices that are compatible with the content type of the embedded media asset;

for each candidate device of the subset of candidate devices:

determine an orientation of a display of the respective candidate device with respect to the user;

determine whether the display of the respective candidate device is within a line of sight of the user, based on the orientation of the display; and in response to determining that the display of the respective candidate device is within the line of sight of the user, determine a perceived display size of the respective candidate device, wherein the perceived display size is proportional to (1) a physical display size of the respective candidate device and (2) the distance between the user and the respective candidate device; and in response to determining that the determined perceived display size of the second user equipment device of the subset of candidate devices is the largest of perceived display sizes of the subset of candidate devices, identify the second user equipment.

13. The system of claim 8, wherein the content type is associated with audio, wherein the control circuitry, when identifying the second user equipment, is further configured to:

receive acknowledgment messages from a plurality of candidate devices, based on the discovery message;

identify, from the plurality of candidate devices, a subset of candidate devices that are compatible with the content type of the embedded media asset;

for each candidate device of the subset of candidate devices:

determine a maximum distance that sound outputted from the respective candidate device can travel; and in response to determining that the distance between the user and the respective candidate device is less than the maximum distance, determine a sound score of the respective candidate device, wherein the sound score represents a quality of sound at a threshold volume; and in response to determining that the sound score of the second user equipment device of the subset of candidate devices is the highest of sound scores of the subset of candidate devices, identify the second user equipment.

14. The system of claim 8, wherein the content type is associated with audio and visuals, and wherein the control circuitry, when identifying the second user equipment, is further configured to:

receive acknowledgment messages from a plurality of candidate devices, based on the discovery message;

identify, from the plurality of candidate devices, a subset of candidate devices that are compatible with the content type of the embedded media asset;

determine that a first candidate device of the subset of candidate devices has a perceived display size that is greater than a threshold size;

determine that a second candidate device, different from the first candidate device, of the subset of candidate devices has a sound score that is greater than a sound threshold; and in response to determining that (1) the first candidate device has the perceived display size that is greater than the threshold size and (2) the second candidate device has the sound score that is greater than the sound threshold, identify the second user equipment as a combination of the first candidate device for visuals and the second candidate device for audio.

15. A method comprising:

determining that a first device is generating for display a digital page, wherein the digital page comprises a link to a video from a content provider; and in response to determining that the digital page comprises the link to the video from the content provider:

transmitting a discovery message via a local network of the first device to discover a second device that is within a proximity of the first device;

receiving a reply comprising data about the second device; and determining, based on the received data about the second device, that the second device is preferred for playing the video:

in response to determining, based on the received data about the second device, that the second device is preferable for playing the video:

causing the second device to generate for display the video from the content provider by accessing the link to the video.

16. The method of claim 15, wherein determining, based on the received data about the second device, that the second device is preferable for playing the video comprises:

receiving data about the first device;

identifying a characteristic of the video;

computing a first metric based on the characteristic of the video and the data about the first device;

computing a second metric based on the characteristic of the video and the data about the second device; and determining that the second device is preferable for playing the video over the first device when the second metric exceeds the first metric.

17. The method of claim 15, wherein the reply is a first reply, and wherein determining, based on the received data about the second device, that the second device is preferable for playing the video comprises:

receiving a second reply comprising data about a third device;

determining, based on the data about the third device, that the third device is incompatible with the video;

determining, based on the data about the second device, that the second device is compatible with the video; and in response to determining that the third device is incompatible with the video and that the second device is compatible with the video, determining that the second device is preferable for playing the video over the third device.

18. The method of claim 15, wherein the data about the second device comprises one of a device identifier of the second device, a type of the second device, a display resolution of the second device, a display size of the second device, an audio capability of the second device, a network capability of the second device, and a user profile associated with the second device.

19. The method of claim 15, wherein causing the second device to generate for display the video from the content provider by accessing the link to the video comprises causing the video to be transmitted from the content provider to the second device.

20. The method of claim 15, wherein determining that the digital page comprises the link to the video from the content provider comprises:
   detecting a position in the digital page comprising the link to the video from the content provider; and
   detecting when a user scrolls to the position in the digital page.

* * * * *